(12) United States Patent  (10) Patent No.: US 7,664,373 B2
Kimura  (45) Date of Patent: Feb. 16, 2010

(54) PROGRAM, DATA PROCESSING METHOD, AND SYSTEM OF SAME

(75) Inventor: Shin Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 882 days.

(21) Appl. No.: 10/900,891

(22) Filed: Jul. 27, 2004

(65) Prior Publication Data

US 2005/0025453 A1 Feb. 3, 2005

(30) Foreign Application Priority Data

Jul. 30, 2003 (JP) ............................ P2003-283180

(51) Int. Cl.
*H04N 5/76* (2006.01)

(52) U.S. Cl. ........................................ 386/96; 386/124
(58) Field of Classification Search .................... 386/96, 386/95, 104, 105, 109, 112, 111, 124; 348/390.1, 348/409.1

See application file for complete search history.

(56) References Cited

U.S. PATENT DOCUMENTS 5,896,358 A * 4/1999 Endoh et al. .................. 369/89

(Continued)

FOREIGN PATENT DOCUMENTS

EP 0 920 219 6/1999

(Continued)

OTHER PUBLICATIONS

SMPTE: "Material Exchange Format (MXF)—File Format Specification (Standard)—SMPTE 377M" SMPTE 377M, 'Online! Jul. 22, 2003, pp. 1-106, XP002313675 Retrieved from the Internet: URL:http://www.smpte.org/standards/pdf/s377m.pdf>.

(Continued)

*Primary Examiner*—David E Harvey
(74) *Attorney, Agent, or Firm*—Frommer Lawrence & Haug LLP; William S. Frommer

(57) ABSTRACT

A program capable of individually decoding video data and audio data from data storing, mixed together, the video data, the audio data, and attribute data interleaved, wherein an SYS parse routine parses data MXF_D to extract system data SYS; a PIC parse routine parses the data MXF_D to extract video data PIC and decodes the related extracted video data PIC based on system data SYS extracted by the SYS parse routine 61, and an SOU parse routine parses the data MXF_D to extract audio data SOU and decodes the related extracted audio data SOU based on the system data SYS extracted by the SYS parse routine.

6 Claims, 27 Drawing Sheets

U.S. PATENT DOCUMENTS

| | | |
|---|---|---|
| 6,275,507 B1 | 8/2001 | Anderson et al. |
| 6,728,824 B1 * | 4/2004 | Chen .............................. 711/1 |
| 7,006,152 B2 * | 2/2006 | Demas et al. ............... 348/565 |
| 2002/0093517 A1 * | 7/2002 | Cheung ...................... 345/629 |
| 2002/0138852 A1 | 9/2002 | Reynolds et al. |
| 2002/0184336 A1 | 12/2002 | Rising, III |
| 2003/0115219 A1 | 6/2003 | Chadwick |

FOREIGN PATENT DOCUMENTS

| | | |
|---|---|---|
| EP | 1 193 981 | 4/2002 |
| JP | 7-50838 | 2/1995 |
| JP | 2003-85875 | 3/2003 |
| WO | WO 99 17552 | 4/1999 |
| WO | WO 02/21845 | 3/2002 |

OTHER PUBLICATIONS

SMPTE: "Material Exchange Format (MXF)—EG41" Proposed SMPTE Engineering Guideline, 'Online! Jul. 22, 2003, pp. 1-74, XP002312809 Retrieved from the Internet: URL:http://www.smpte.org/standards/pdf/eg41.pds>.

Al Kovalick: "Material Exchange Format FAQ" Pinnacle Systems, May 20, 2002, XP002276055.

Hoffmann H: "File Exchange formats for Networked television production" EBU Review Technical, European Broadcasting Union, Geneva, CH, 'Online! Jul. 2002, pp. 1-8, XP002276056 ISSN: 1018-7391.

* cited by examiner

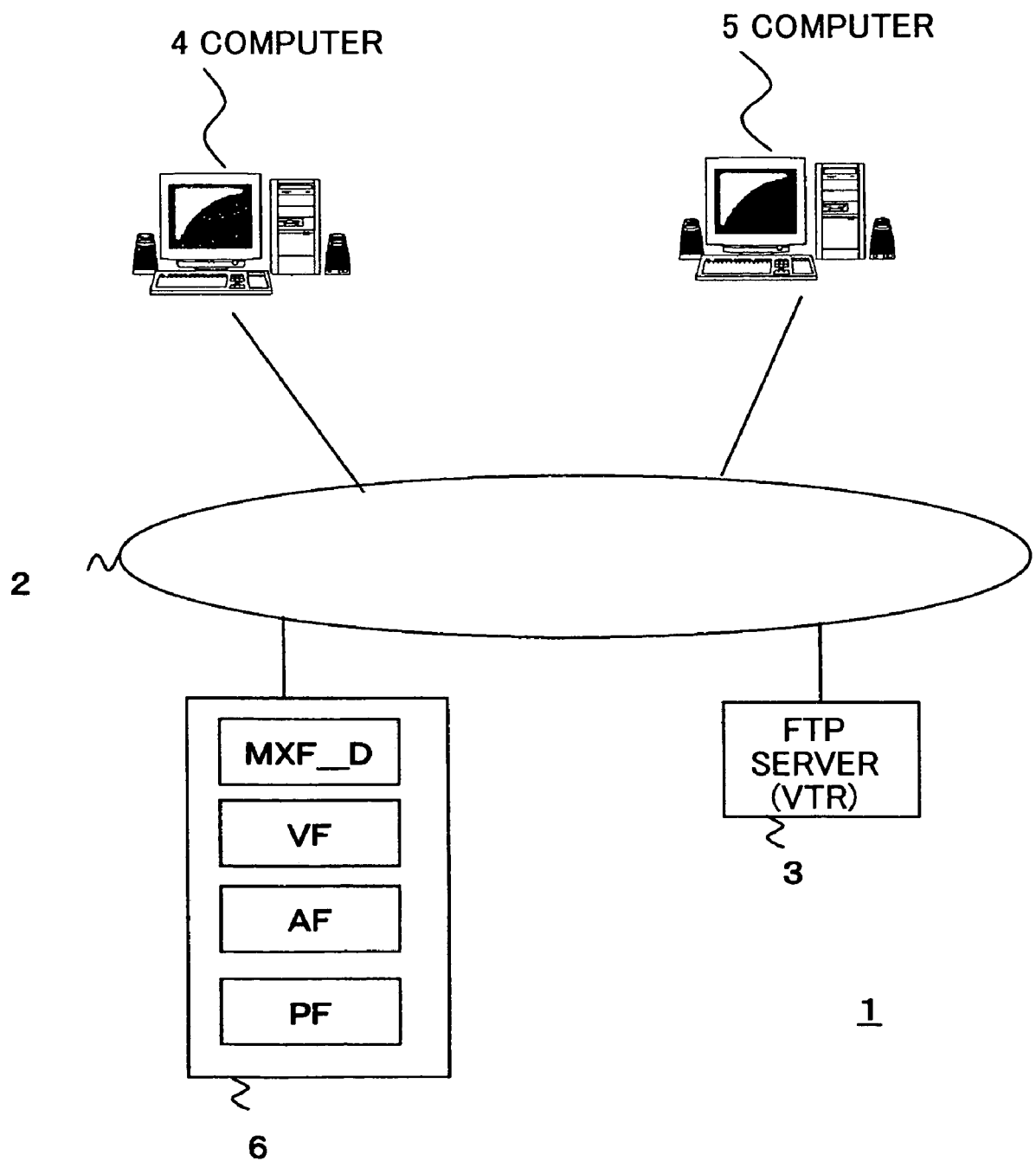

PRG1 : MXF PROCESSING PROGRAM
PRG2 : EDIT PROCESSING PROGRAM

PRG3 : EDIT PROCESSING PROGRAM

KLV DATA

FIG. 8

VideoCommonInfo VideoFormat ;

VideoCommonInfo Width ;

VideoCommonInfo Height ;

VideoCommonInfo Framesize=frameSize;

VideoCommonInfo Scale;

VideoCommonInfo Rate ;

VideoCommonInfo Scanlineinfo ;

<u>VCPD</u>

FIG. 10

WavFormat wFormatTag = WAVE_FORMAT_PCM

WavFormat nChannels

WavFormat nSamplesPerSec

WavFormat nAvgBytesPerSec

WavFormat nBlockAlign

WavFormat wBitsPerSample

WavFormat cbSize

WFPD

FIG. 15A

WHEN THE DATA MXF_D IS
IMX50_625, IMX40_625, IMX30_625

VideoCommonInfo VideoFormat = 2;

VideoCommonInfo Width  = 720;

VideoCommonInfo Height  = 576;

VideoCommonInfo Framesize  = frameSize;

VideoCommonInfo Scale  = 1;

VideoCommonInfo Rate  = 25;

VideoCommonInfo Scanlineinfo  = 0;

FIG. 15B

WHEN THE DATA MXF_D IS
IMX50_525, IMX40_525, IMX30_525

VideoCommonInfo Videoformat = 2;

VideoCommonInfo Width  = 720;

VideoCommonInfo Height  = 486;

VideoCommonInfo Framesize  = frameSize;

VideoCommonInfo Scale  = 1001;

VideoCommonInfo Rate  = 30000;

VideoCommonInfo Scanlineinfo  = 1;

FIG. 16

IMX50_625: frameSize = 0x3E000

IMX40_625: frameSize = 0x31000

IMX30_625: frameSize = 0x25000

IMX50_525: frameSize = 0x33000

IMX40_525: frameSize = 0x29000

IMX30_525: frameSize = 0x1F000

FIG. 17

WavFormat wFormatTag = WAVE_FORMAT_PCM

WavFormat nChannels = 1

WavFormat nSamplesPerSec = 48000

**WavFormat nAvgBytesPerSec = 2 * 48000**

WavFormat nBlockAlign = 2

WavFormat wBitsPerSample = 16

WavFormat cbSize = 0

PIC PARSE ROUTINE

SOU PARSE ROUTINE

MXF-MUX THREAD

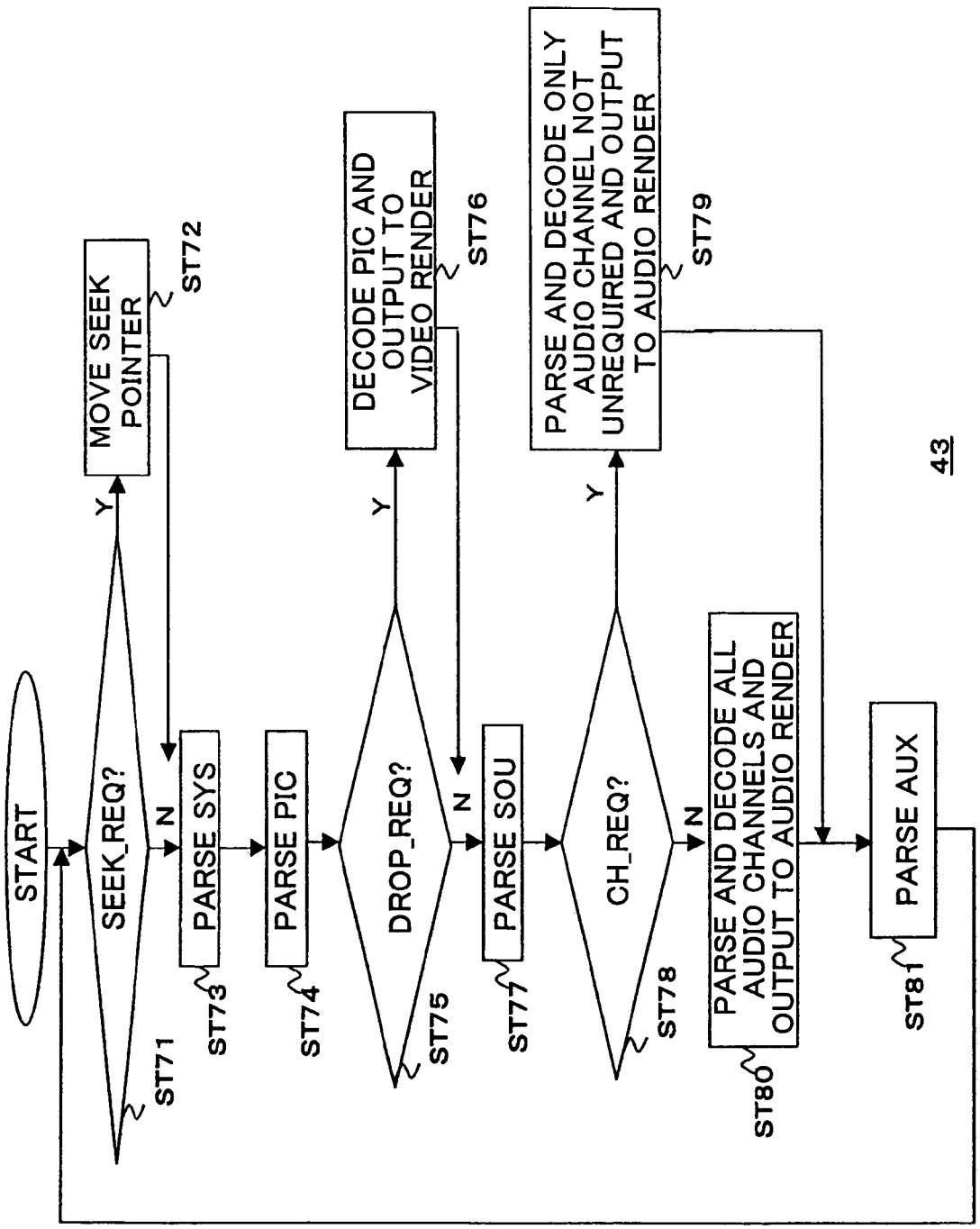

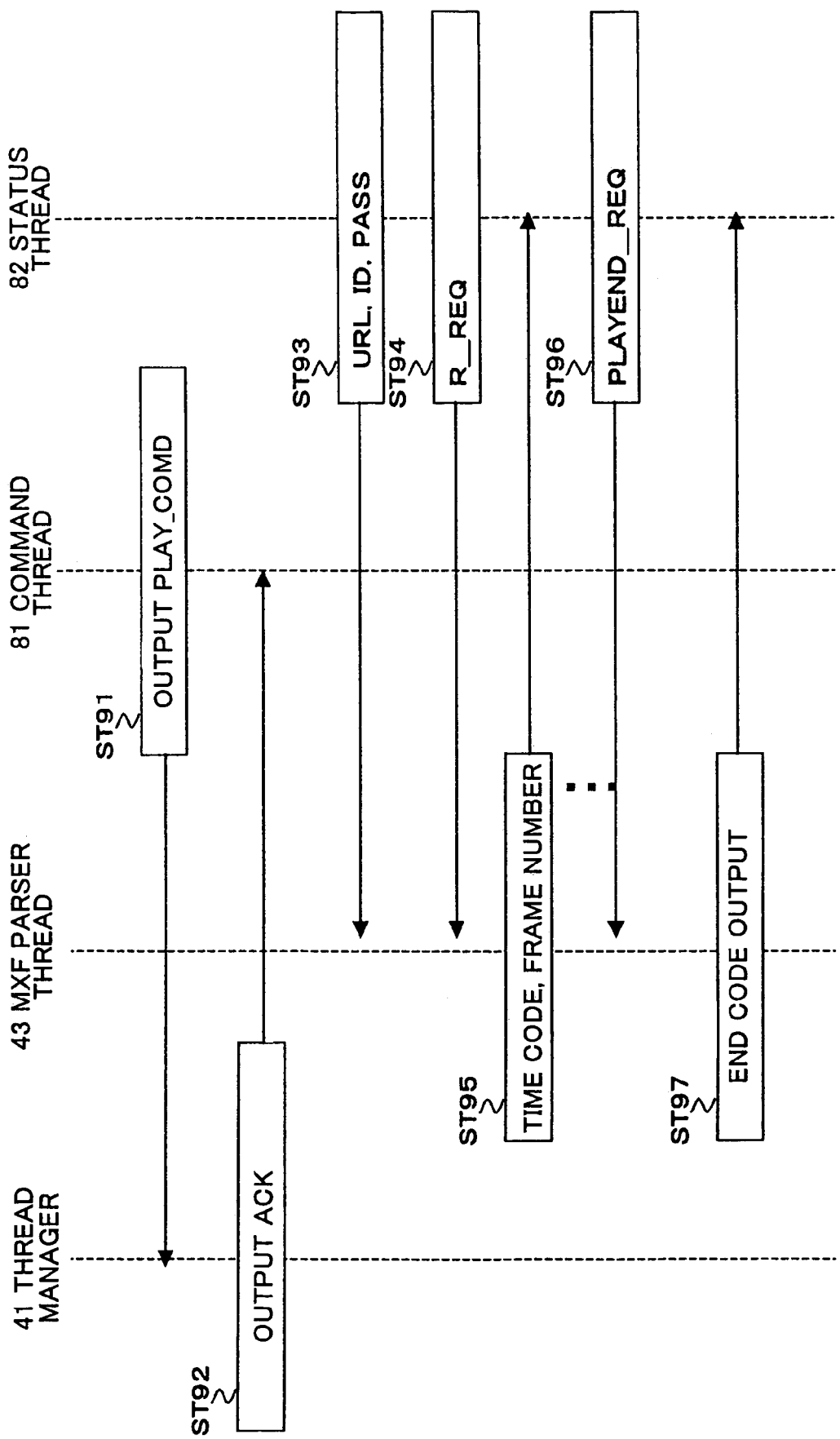

PROGRAM, DATA PROCESSING METHOD, AND SYSTEM OF SAME

BACKGROUND OF THE INVENTION

1. Field of the Invention

The present invention relates to a program for decoding video data and audio data, a data processing method, and a system of the same.

2. Description of the Related Art

One of file exchange formats of video data and audio data is the "Material Exchange Format (MXF)". The MXF is composed of meta data included in header data and a plurality of frame data etc. Each frame data includes 1 frame's worth of video data, the audio data corresponding to that, and system data etc. indicating attributes of the video data and audio data. Namely, in data of the MXF, the video data, the audio data, and the system data are stored interleaved together. In the MXF, by describing in the meta data and system data the attributes such as the coding scheme, compression method, data structure, time code, and edit content of the video data and audio data in each frame data, file exchange is enabled with a format not depending upon the attributes of the video data and audio data.

In a PC or other computer, when performing processing to reproduce video data and audio data, it is necessary for the video data and the audio data to exist as separate video file data and audio file data. Due to this, there is the problem that the computer cannot reproduce video data and audio data by MXF data as it is. Further, when performing processing for reproducing video data and audio data input from a process for conversion in synchronization, due to the processing load, sometimes the video data cannot be reproduced at normal speed or more. In this case, there is the problem that the reproduced image and sound cannot be synchronized.

SUMMARY OF THE INVENTION

An object of the present invention is to provide a program capable of individually decoding video data and audio data from data storing video data, audio data, and attribute data interleaved, a method of the same, and a system of the same.

Another object of the present invention is to provide a program capable of stably maintaining synchronization between a reproduced image and sound when performing processing for synchronously reproducing video data and audio data input from a process for conversion processing, a method of the same, and a system of the same.

In order to solve the above problems of the related art, according to a first aspect of the invention, there is provided a program making a data processing system execute a first processing routine for parsing processed data storing, mixed together, a plurality of video data, a plurality of audio data, and a plurality of attribute data indicating the attributes of the video data and the audio data so as to extract the attribute data; a second processing routine for parsing the processed data to extract the video data and decoding the extracted video data based on the attribute data extracted by the first processing routine; and a third processing routine for parsing the processed data to extract the audio data and decoding the extracted audio data based on the attribute data extracted by the first processing routine.

The mode of operation of the program of the first aspect of the invention is as follows. The program of the first aspect of the invention is executed by a data processing system. Due to this, the data processing system activates the first processing routine, the second processing routine, and the third processing routine. The first processing routine is for parsing the processed data storing, mixed together, a plurality of video data, a plurality of audio data, and a plurality of attribute data indicating attributes of the video data and the audio data to extract the attribute data. Then, the second processing routine parses the processed data to extract the video data and decodes the extracted video data based on the attribute data extracted by the first processing routine. Further, the third processing routine parses the processed data to extract the audio data and decodes the extracted audio data based on the attribute data extracted by the first processing routine.

According to a second aspect of the invention, there is provided a data processing method comprising a first step of parsing processed data storing, mixed together, a plurality of video data, a plurality of audio data, and a plurality of attribute data indicating attributes of the video data and the audio data to extract the attribute data; a second step of parsing the processed data to extract the video data and decoding the extracted video data based on the attribute data extracted in the first step; and a third step of parsing the processed data to extract the audio data and decoding the extracted audio data based on the attribute data extracted in the first step.

The mode of operation of the data processing method of the second aspect of the invention is as follows.

First, in the first step, the processed data storing, mixed together, a plurality of video data, a plurality of audio data, and a plurality of attribute data indicating attributes of the video data and the audio data is parsed to extract the attribute data. Next, in the second step, the processed data is parsed to extract the video data, and the extracted video data is decoded based on the attribute data extracted in the first step. Further, in the third step, the processed data is parsed to extract the audio data, and the extracted audio data is decoded based on the attribute data extracted in the first step.

According to a third aspect of the invention, there is provided a data processing system comprising a first means for parsing processed data storing, mixed together, a plurality of video data, a plurality of audio data, and a plurality of attribute data indicating the attributes of the video data and the audio data to extract the attribute data; a second means for parsing the processed data to extract the video data and decoding the extracted video data based on the attribute data extracted by the first means; and a third means for parsing the processed data to extract the audio data and decoding the extracted audio data based on the attribute data extracted by the first means.

The mode of operation of the data processing system of the third aspect of the invention is as follows.

First, the first means parses the processed data storing, mixed together, a plurality of video data, a plurality of audio data, and a plurality of attribute data indicating attributes of the video data and the audio data to extract the attribute data. Next, the second means parses the processed data to extract the video data and decodes the extracted video data based on the attribute data extracted in the first step. Further, the third means parses the processed data to extract the audio data and decodes the extracted audio data based on the attribute data extracted in the first step.

According to a fourth aspect of the invention of the present invention, there is provided a program for making a data processing system execute processing for receiving as input video data and audio data from a conversion process for performing predetermined data conversion to generate the video data and the audio data and reproducing the same, which reproduces the video data and the audio data input from the conversion process in synchronization and, when deciding that the video data cannot be reproduced at normal speed or more, makes the data processing system execute a reproduction process for outputting a request for suspending the input of the video data to the conversion process.

According to a fifth aspect of the invention, there is provided a data processing method for performing processing for receiving as input video data and audio data from a conversion process for performing predetermined data conversion to generate the video data and the audio data and reproducing the same, comprising a first step of reproducing the video data and the audio data input from the conversion process in synchronization; a second step of deciding whether or not the video data can be reproduced by the first step at normal speed or more; and a third step, when deciding in the second step that the data cannot be reproduced at normal speed or more, outputting a request for suspending the input of the video data to the conversion process.

The mode of operation of the data processing method of the fifth aspect of the invention is as follows.

First, in the first step, the video data and the audio data input from the conversion process are reproduced in synchronization. Further, it is decided in the second step whether or not the video data can be reproduced by the first step at normal speed or more. Then, in the third step, when deciding in the second step that the data cannot be reproduced at normal speed or more, a request for suspending the input of the video data is output to the conversion process.

According to a sixth aspect of the invention, there is provided a data processing system for performing processing for receiving video data and audio data from a conversion process for performing predetermined data conversion to generate the video data and the audio data and reproducing the same, comprising a first means for reproducing the video data and the audio data input from the conversion process in synchronization; a second means for deciding whether or not the video data can be reproduced by the first means at normal speed or more; and a third means, when deciding in the second means that the data cannot be reproduced at normal speed or more, outputting a request for suspending the input of the video data to the conversion process.

According to the first to third aspects of the invention, a program capable of individually decoding the video data and the audio data from data storing video data, audio data, and attribute data interleaved, a method of the same, and a system of the same can be provided.

According to the fourth to sixth aspects of the invention, when performing processing for reproducing the video data and the audio data input from the process for conversion processing in synchronization, a program capable of stably maintaining the synchronization between the reproduced image and sound, a method of the same, and a system of the same can be provided.

BRIEF DESCRIPTION OF THE DRAWINGS

These and other objects and features of the present invention will become clearer from the following description of the preferred embodiments given with reference to the accompanying drawings, in which:

FIG. 1 is a view of the overall configuration of an editing system according to an embodiment of the present invention;

FIG. 8 is a view for explaining video common property data VCPD shown in FIG. 7;

FIG. 10 is a view for explaining WAVE specifying data WFPD shown in FIG. 9;

FIG. 15 is a view for explaining the processing of step ST5 shown in FIG. 13;

FIG. 16 is a view for explaining the processing of step ST5 shown in FIG. 13;

FIG. 17 is a view for explaining the processing of step ST5 shown in FIG. 13;

FIG. 26 is a view for explaining the processing of the MXF parser thread in the case shown in FIG. 25; and FIG. 27 is a view for explaining the request and the data transferred between the MXF parser thread and the reproduction thread in the case shown in FIG. 25.

DESCRIPTION OF THE PREFERRED EMBODIMENTS

Below, an explanation will be given of an embodiment of the present invention.

First, an explanation will be given of the correspondence between the configuration of the present invention and the configuration of the present embodiment. An MXF processing program PRG1 of the present embodiment corresponds to the program of the first aspect of the invention. An SYS parse routine 61 shown in FIG. 12 and FIG. 25 etc. corresponds to the first processing routine of the first aspect of the invention, a PIC parse routine 62 corresponds to the second processing routine of the first aspect of the invention, and an SOU parse routine 63 corresponds to the third processing routine of the second aspect of the invention. A computer 4 corresponds to the data processing system of the first aspect of the invention and the third aspect of the invention. By an SYS parse routine 61, the PIC parse routine 62, and the SOU parse routine 63 shown in FIG. 25 etc., the first means, the second means, and the third means of the third aspect of the invention are realized. Data MXF_D shown in FIG. 5 corresponds to the processed data of the first to third aspects of the inventions. Video data PIC shown in FIG. 5 corresponds to the video data of the first to third aspects of the inventions, audio data SOU corresponds to the audio data of the first to third aspects of the inventions, and system data SYS or header data HEADER correspond to the attribute data of the first to third aspects of the inventions. Frame data FLD_1 to FLD_n shown in FIG. 5 correspond to module data or frame data of the present invention.

Figure 3:
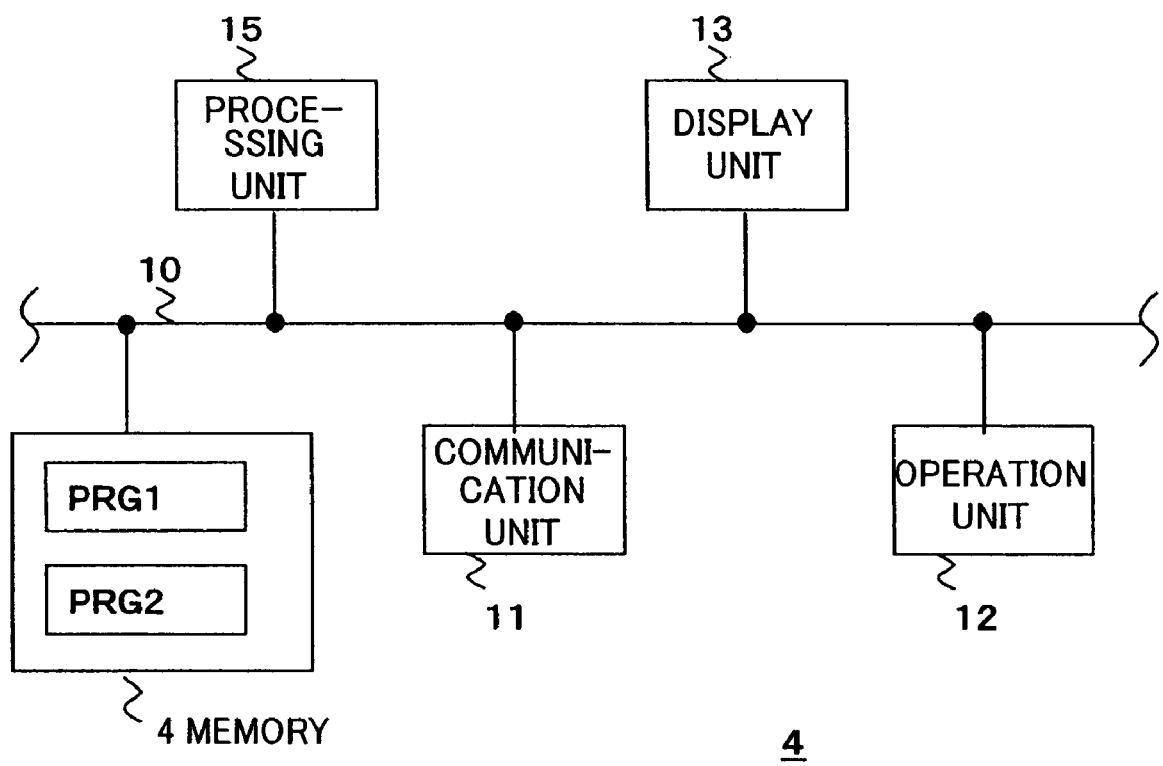
FIG. 3 is a view of the configuration of the computer 4 shown in FIG. 1.
Figure 4:
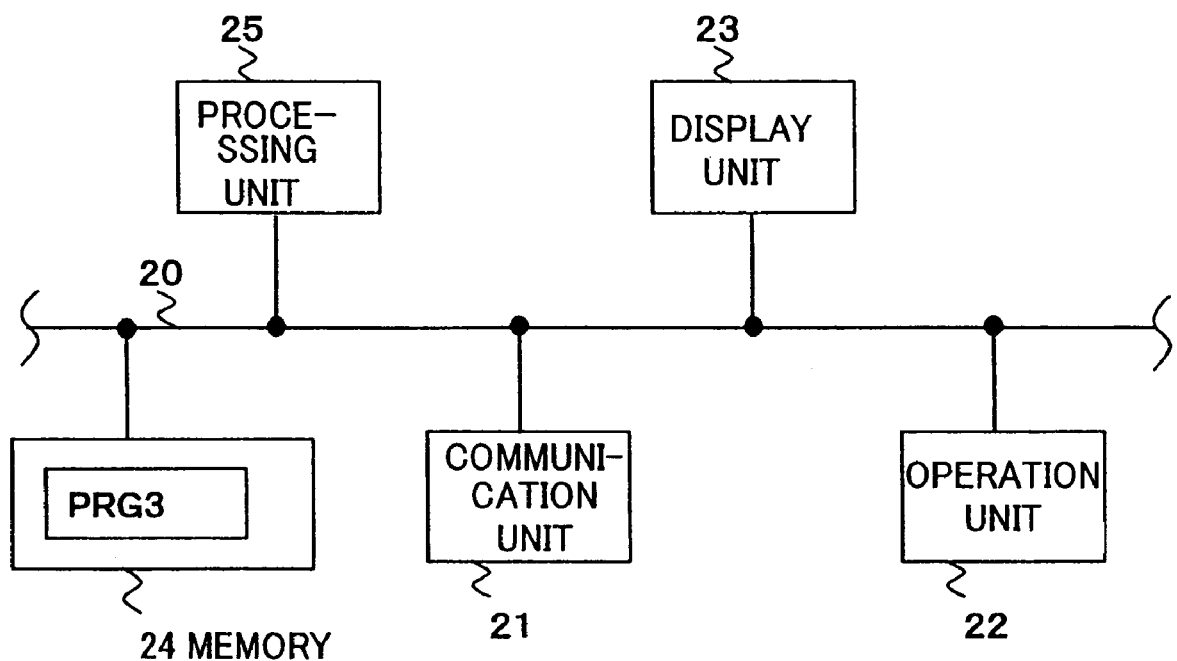
FIG. 4 is a view of the configuration of the computer 5 shown in FIG. 1.

Edit processing programs PRG2 and PRG3 shown in FIG. 3 and FIG. 4 correspond to the program of the fourth aspect of the invention. Reproduction threads 83 shown in FIG. 23 to FIG. 25 correspond to the reproduction process of the fourth aspect of the invention. An MXF parser thread 43 corresponds to the conversion processes of the fourth to sixth aspects of the invention. The computer 4 and the computer 5 correspond to the data processing system of the sixth aspect of the invention. A video render routine 72 and an audio render routine 74 form the first means of the sixth aspect of the invention, while the video render routine 72 forms the second means and the third means of the sixth aspect of the invention.

Figure 24:
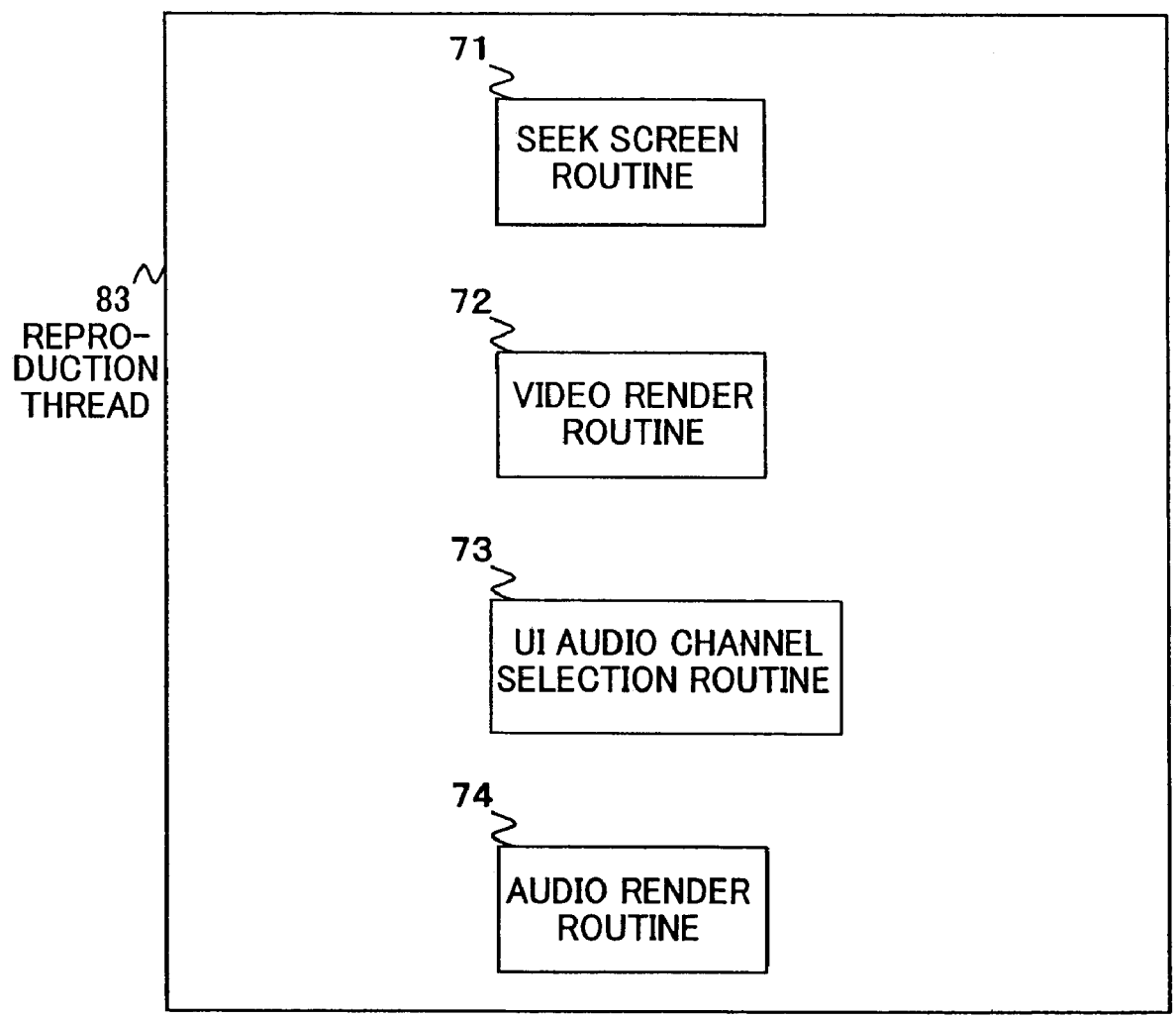
FIG. 24 is a view for explaining the reproduction thread shown in FIG. 23.
Figure 25:
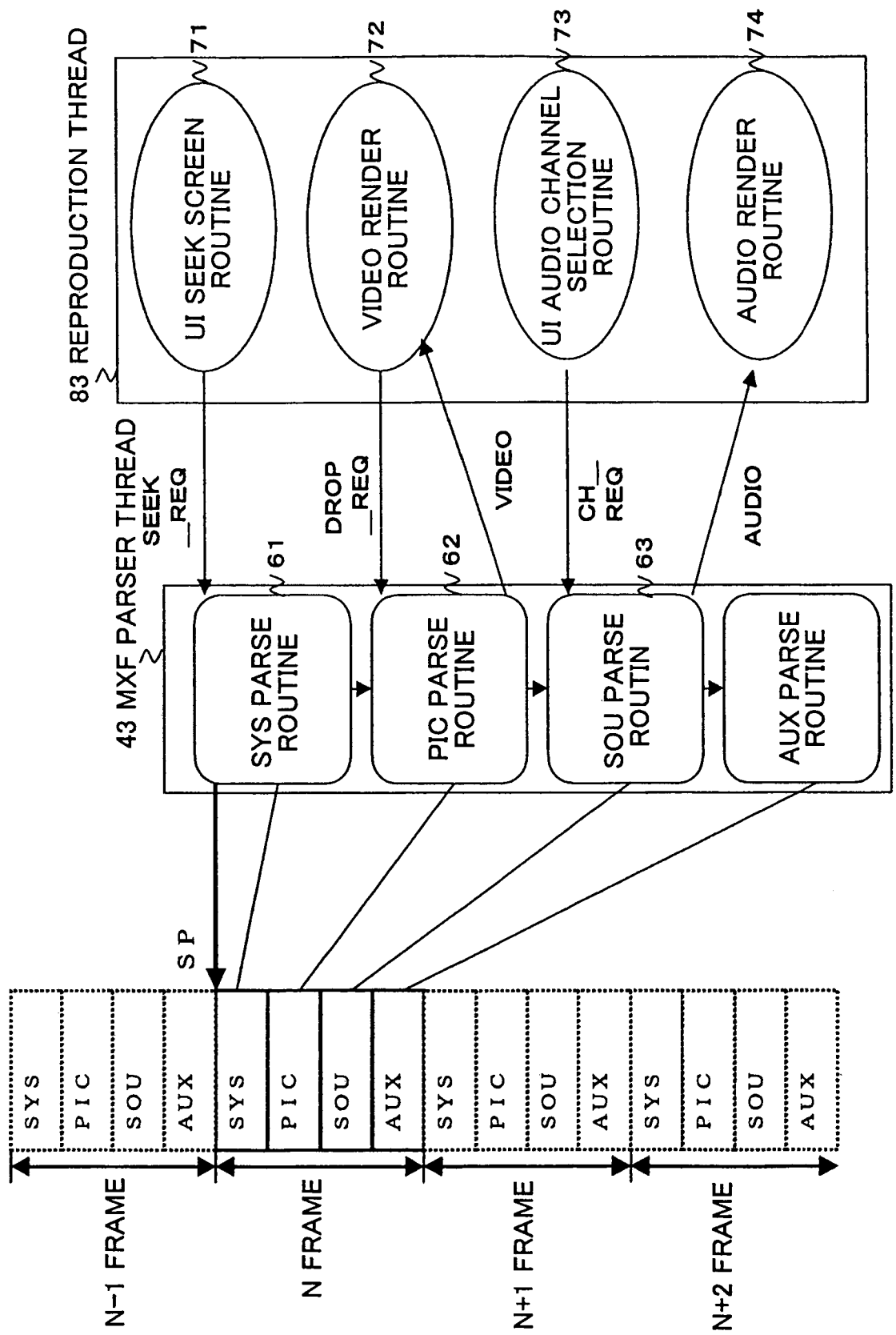
FIG. 25 is a view for explaining the processing of the reproduction thread and the MXF parser thread shown in FIG. 23.

Next, a brief explanation will be given of the edit system 1 shown in FIG. 1 to FIG. 27. As shown in FIG. 25, the MXF parser thread 43 parses tdata MXF_D storing, mixed together, a plurality of video data PIC, a plurality of audio data SOU, and a plurality of system data indicating attributes of the video data PIC and the audio data SOU. The MXF parser thread 43 has an SYS parse routine 61, a PIC parse routine 62, and an SOU parse routine 63. The SYS parse routine 61 parses the data MXF_D to extract the system data SYS. The PIC parse routine 62 parses the data MXF_D to extract the video data PIC and decodes the related extracted video data PIC based on the system data SYS extracted by the SYS parse routine 61. Further, the SOU parse routine 63 parses the data MXF_D to extract the audio data SOU and decodes the related extracted audio data SOU based on the system data SYS extracted by the SYS parse routine 61.

Further, the video render routine 72 shown in FIG. 25 performs the processing for reproduction of the video data VIDEO from the MXF parser thread 43 in synchronization with the processing for reproduction of the audio by the audio render routine 74. An UI audio channel selection routine 73, when deciding that the video data VIDEO cannot be reproduced at normal speed or more, outputs a request for suspending the input of the video data VIDEO to the MXF parser thread 43.

Below, a detailed explanation will be given of the editing system 1 based on the drawings. FIG. 1 is a view of the overall configuration of the editing system 1 according to an embodiment of the present invention. As shown in FIG. 1, the editing system 1 has for example a file transfer protocol (FTP) server 3, a computer 4, a computer 5, and a "redundant array of inexpensive disks" (RAID) 6 which communicate via a network 2. In the present embodiment, for example, the computer 4, the computer 5, and the RAID 6 are connected via a network such as a storage area network (SAN)

[FTP Server 3]

The FTP server 3 transmits the received MXF data to the computer 4 and the computer 5 based on the FTP via the network 2.

[Computer 4]

At the computer 4, for example, as shown in FIG. 2, the MXF process 8 for processing the MXF data and an edit process 9a for performing the edit processing such as a non-linear edit NLE processing operate.

FIG. 3 is a view of the configuration of the computer 4 shown in FIG. 1 and FIG. 2. As shown in FIG. 3, the computer 4 has, for example, a communication unit 11, an operation unit 12, a display unit 13, a memory 14, and a processing unit 15 all connected via a data line 10. The communication unit 11 performs the data transfer with the FTP server 3, the computer 5, and the RAID 6 via the network 2. The operation unit 12 is an operating means such as a keyboard or a mouse and outputs an operation signal in accordance with the operation of the user to the processing unit 15. The display unit 13 displays an image (picture) in accordance with the display signal from the processing unit 15. The memory 14 records the MXF processing program PRG1 describing the processing of the MXF process 8 shown in FIG. 2 and an edit processing program PRG2 describing the processing of the edit process 9a. The processing unit 15 activates the MXF process 8 based on (by executing) the MXF processing program PRG1 recorded in the memory 14 and activates the edit process 9a based on the edit processing program PRG2. Note that, in the present embodiment, the threads concerning the MXF process 8 are realized by the processing unit 15 executing the MXF processing program PRG1. Further, the threads concerning the edit process 9a are realized by the processing unit 15 executing the edit processing program PRG2.

[Computer 5]

At the computer 5, for example as shown in FIG. 2, an edit process 9b for performing edit processing such as editing operates. FIG. 4 is a view of the configuration of the computer 5 shown in FIG. 1 and FIG. 2. As shown in FIG. 4, the computer 5 has, for example a communication unit 21, an operation unit 22, a display unit 23, a memory 24, and a processing unit 25 all connected via a data line 20. The communication unit 21 performs the data transfer with the FTP server 3, the computer 4, and the RAID 6 via the network 2. The operation unit 22 is an operating means such as a keyboard and a mouse and outputs an operation signal in accordance with the operation of the user to the processing unit 25. The display unit 23 displays an image (picture) in accordance with the display signal from the processing unit 25. The memory 24 records the edit processing program PRG3 describing the processing of the edit process 9b shown in FIG. 2. The processing unit 25 activates the edit process 9b based on the edit processing program PRG3 recorded in the memory 24. Further, the threads concerning the edit process 9b are realized by the processing unit 25 executing the edit processing program PRG3.

The RAID 6 is for recording the MXF data, video file data VD, audio file data AF, and attribute file data PF. Here, the MXF data is defined by the MXF mentioned later. Further, the video file data VF and the audio file data AF have formats able to be utilized (reproduced) by the edit processes 9a and 9b. The attribute file data PF indicates the attributes of the video file data VF and the audio file data AF.

Below, an explanation will be given of the MXF data, the video file data VF, and the audio file data AF.

[MXF_D]

Figure 5:
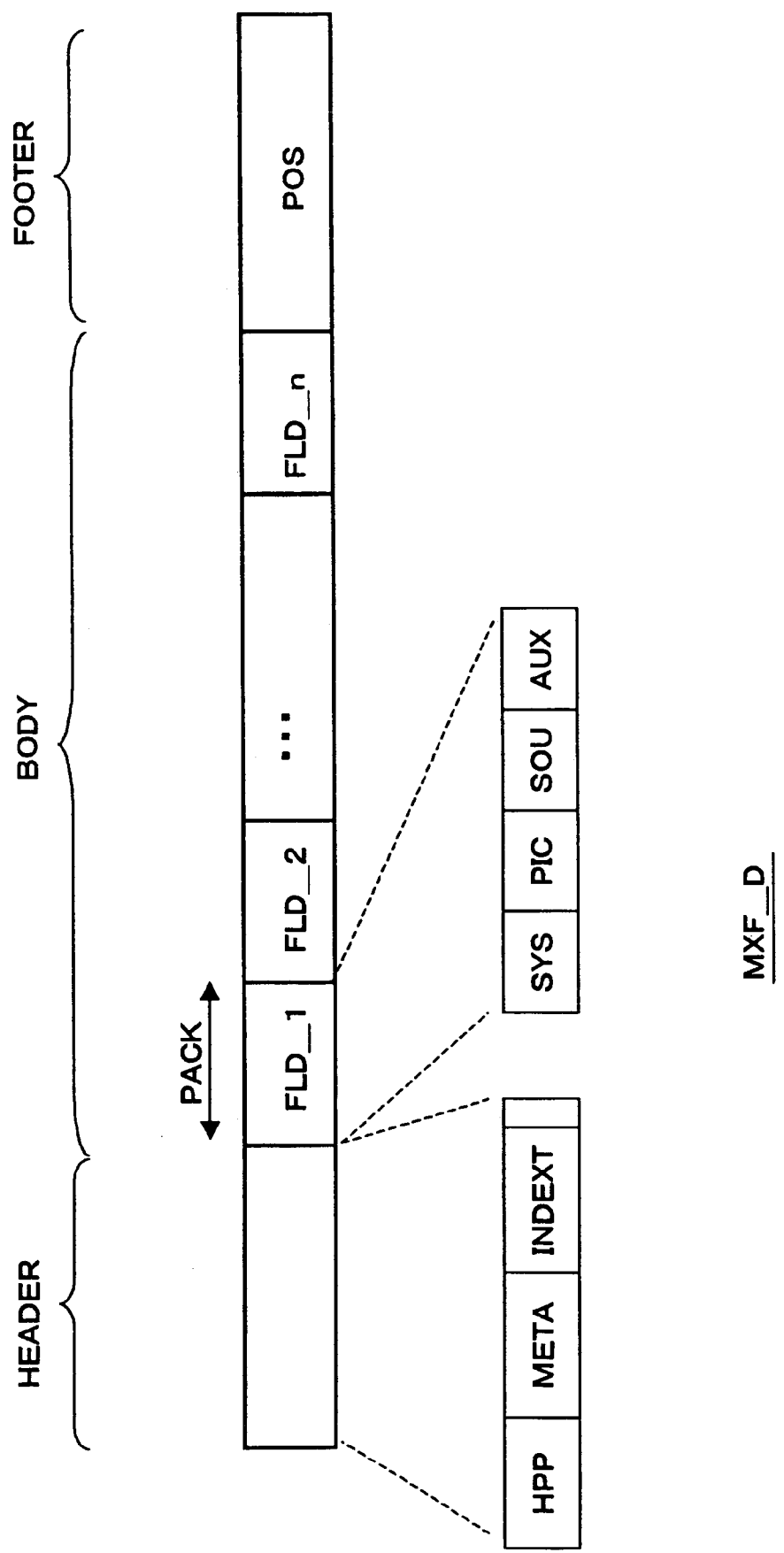
FIG. 5 is a view for explaining data MXF_D.

Below, an explanation will be given of the data MXF_D of the MXF format. FIG. 5 is a view for explaining the format of the data MXF_D. As shown in FIG. 5, the data MXF_D is composed of header data HEADER, body data BODY, and footer data FOOTER. Each of the header data HEADER, the body data BODY, and the footer data FOOTER is composed of a plurality of module data referred to as a pack PACK. The header data HEADER is composed of a header partition pack HPP, meta data META, an index table INDEX, etc. The header partition pack HPP indicates the attribute data with respect to the whole data MXF_D. The header partition pack HPP, when indicating for example "Closed partition", can indicate a frame number which is the number of frame data included in the data MXF_D inside the meta data META.

The meta data META indicates attributes such as a coding method of the frame data (video data and audio data) stored in the body data BODY, a keyword concerning the content of the related frame data, a title, identification data, edit data, preparation time data, and edit time data. Further, the meta data META includes, other than the above, for example a time code concerning the frame data, data for specifying dropped frame data, the above frame number (Duration), etc. The index table INDEXT indicates the data used for accessing the frame data in the body data BODY at a high speed when utilizing the data MXF_D.

The body data BODY includes a plurality of frame data FLD_1 to FLD_n. Here, n is any integer of 1 or more. Each of the frame data FLD_1 to FLD_n, as shown in FIG. 5, includes 1 frame's worth of the video data PIC and audio data SOU, a system data SYS indicating attributes of them, and data AUX. The system data SYS indicates for example the format and type of the video data PIC and the audio data SOU. The system data SYS indicates for example the format of MXF_D (for example D10 standardized by SMPTE) and type in the format (for example IMX50_625, IMX40_625, IMX30_625, IMX50_525, IMX40_525, and IMX30_525 standardized by SMPTE). The system data SYS indicates, other than the above description, for example a coding system, a time code, identification data of the data MXF_D constituted by a "unique material identifier" (UMID), etc.

The video data PIC is the video data encoded by MPEG (Moving Picture Experts Group) or the like. The audio data SOU is the audio data encoded by AES (Audio Engineering Society) 3 or the like. In this way, the data MXF_D is stored in a state with the video data PIC and the audio data SOU interleaved. The footer data FOOTER includes the identification data indicating the terminal end of the data MXF_D.

Figure 6:
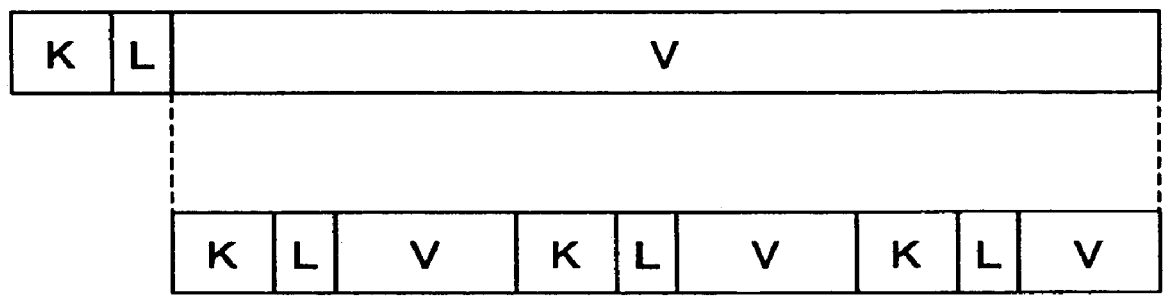
FIG. 6 is a view for explaining KLV data forming part of the data MXF_D shown in FIG. 4.

Each of the above header partition pack HPP, the meta data META, the index data INDEXT, the frame data FLD_1 to FLD_n, and the footer data FOOTER is composed of one or more pack data PACK. Each pack data is composed of one or more KLV data. FIG. 6 is a view for explaining the KLV data. As shown in FIG. 6, the KLV data is composed of a key (K), a data length (L), and data (V). The key (K) and the data length (L) are data each having a fixed length, the key (K) is identification data of the content of for example the data (V), and the data length (L) indicates the data length of the data (V). Regarding the KLV data, as shown in FIG. 6, use can be made of the KLV data as the data (V).

[VF]

Figure 7:
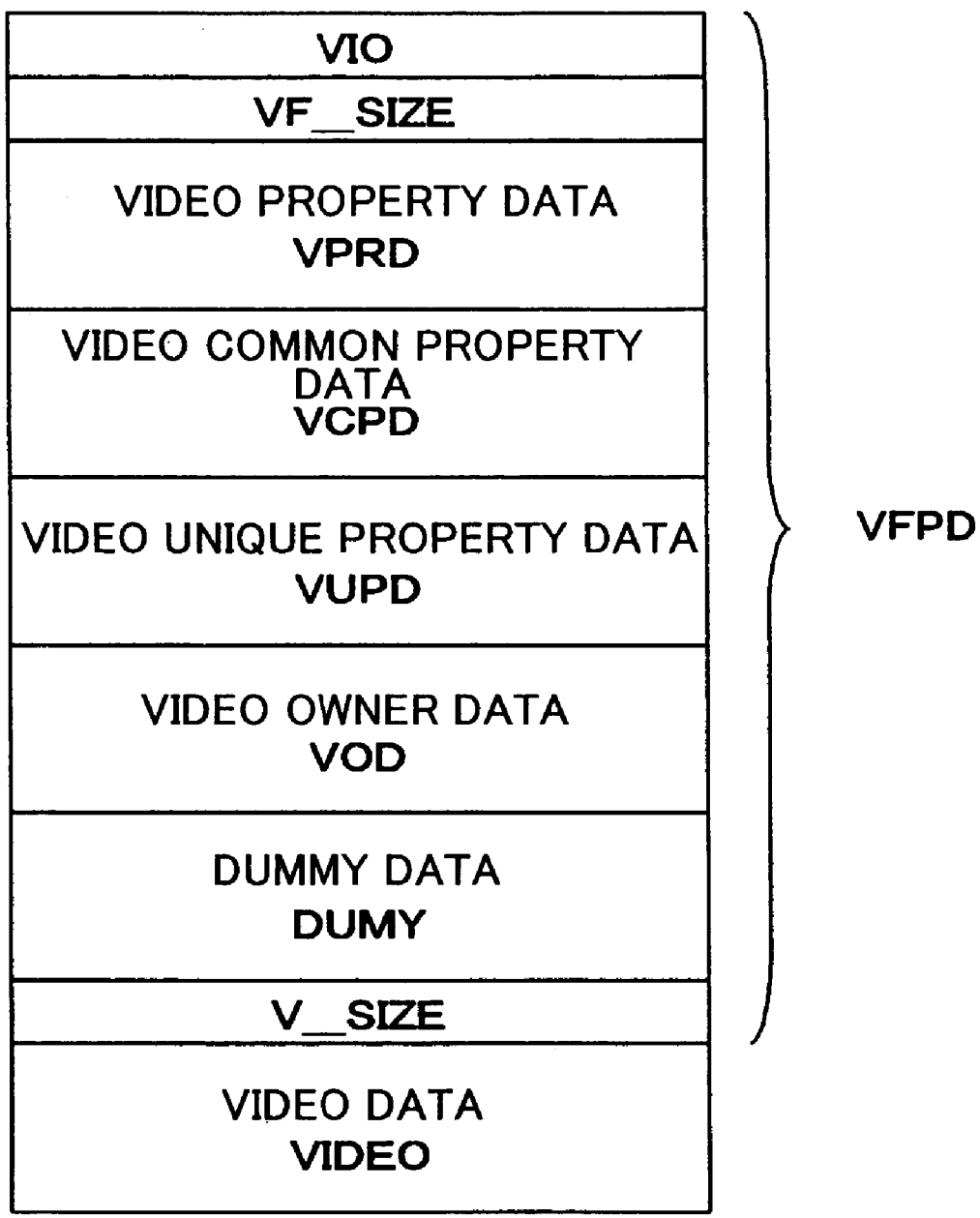
FIG. 7 is a view for explaining video file data VF of an embodiment of the present invention.

Below, an explanation will be given of the video file data VF of the present embodiment. FIG. 7 is a view for explaining the format of the video file data VF of the present embodiment. As shown in FIG. 7, the video file data VF includes for example identification data VIO, data VF_SIZE, video property data VPRD, video common property data VCPD, video unique property data VUPD, video owner data VOD, dummy data DUMY, data V_SIZE, and video data VIDEO. In the present embodiment, the video file attribute data VFPD is comprised of the identification data VIO, the data VF_SIZE, the video property data VPRD, the video common property data VCPD, the video unique property data VUPD, the video owner data VOD, the dummy data DUMY, and the data V_SIZE. The identification data VIO indicates the head of the video file data VF. The data VF_SIZE indicates the data length of the video file data VF. The video property data VPRD indicates the identification data of the video file data VF, the version information etc.

The video common property data VCPD indicates the specific information common to all video formats. The video common property data VCPD indicates, for example, as shown in FIG. 8, a data VideoFormat, Width, Height, Framesize, Scale, Rate, Scanlineinfo, etc. The data VideoFormat indicates the type of the video data VIDEO, for example existence of compression, whether or not it is DV (Digital Video), whether or not it is MPEG (coding method), and whether or not it is HDCAM (Handycam). The data Width indicates a number of pixels in a lateral direction of the image (lateral width) of the video data VIDEO. The data Height indicates the number of lines in a vertical direction of the image (vertical width) of the video data VIDEO. The data Framesize indicates the size (data length) of one frame by the number of bytes. In the present embodiment, the size is a multiple of 4096 bytes. The data Scale and Rate are used for obtaining data indicating the reproduction rate by the number of frames per second by dividing the unit of time Rate by Scale. The data Scanlineinfo indicates the scan line information.

The video unique property data VUPD indicates the property information unique to the format designated by the data Videoformat. The video unique property data VUPD indicates for example the type of the noncompression data, the type of the DV format, the type of the MPEG format, and the data type of MPEG. The video owner data VOD indicates the information concerning the application which owns the video file data VF at present. The dummy data DUMY is the data prescribed so that the size of the video file attribute data VFPD becomes 4096 bytes. The data V_SIZE indicates the data size of the video file data VIDEO. The video data VIDEO is the video data of a plurality of frames prescribed so that one frame becomes a whole multiple of 4096 bytes. By this, it becomes possible to access the video data VIDEO using 4096 bytes as the minimum unit. In the data MXF_D, the coding method of the video data VIDEO, the format of the compression method, etc. may be any method, format, etc.

[AF]

Figure 9:
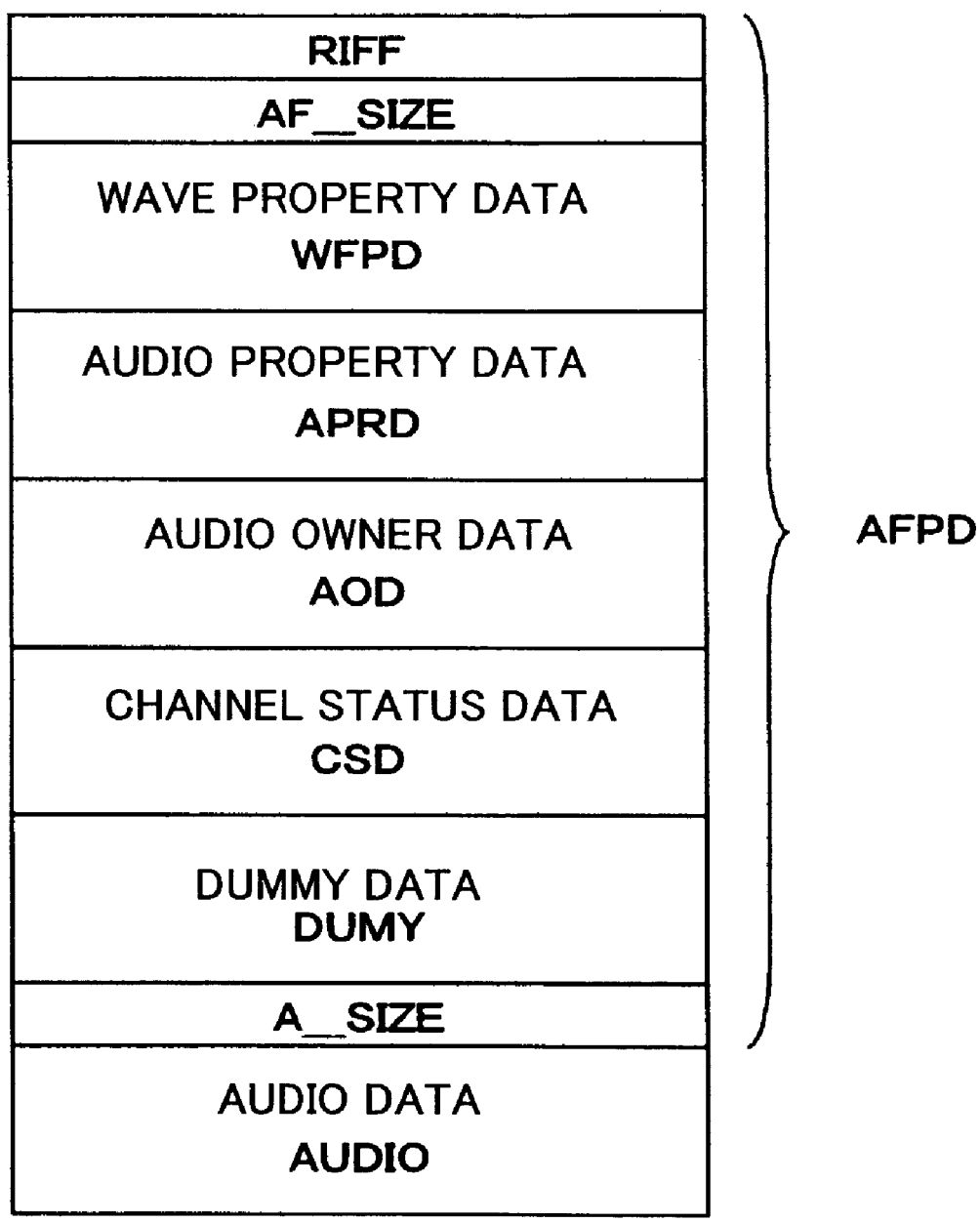
FIG. 9 is a view for explaining audio file data AF of the embodiment of the present invention.

Below, an explanation will be given of the audio file data AF of the present embodiment. FIG. 9 is a view for explaining the format of the audio file data AF of the present embodiment. As shown in FIG. 9, the application program AP includes identification data RIFF, data AF_SIZE, WAVE property data WFPD, audio property data APRD, audio owner data AOD, channel status data CSD, dummy data DUMY, data A_SIZE, and audio data AUDIO. In the present embodiment, the audio file attribute data AFPD is comprised of the identification data RIFF, the data AF_SIZE, the WAVE property data WFPD, the audio property data APRD, the audio owner data AOD, the channel status data CSD, the dummy data DUMY, and the data A_SIZE. The identification data RIFF indicates the head of the audio file data AF. The data AF_SIZE indicates the data length of the audio file data AF. The WAVE property data WFPD indicates, for example, as shown in FIG. 10, data wFormaTag, nChannels, nSamplesPerSec, nAvgBytesPerSec, nBlockAlign, wBitsPerSample, and cbSinse. The data wFormatTag indicates the format of the audio file data AF. The data nChannels indicates the number of channels. The data nSamplesPerSec indicates the sample rate. The data nAvgBytesPerSec indicates a buffer estimation. The data nBlockAlign indicates the block size of the data. The data wBitsPerSample indicates the number of sample bits of the unit of mono data. The data cbSise indicates the number of bytes of the size of the expansion information.

The audio property data APRD indicates the data length of the audio data AUDIO, the version of the audio file data AF, etc. The audio owner data AOD indicates the information concerning the application which has the audio file data AF at present. The channel status data CSD indicates the information concerning the channel of the audio data AUDIO. The dummy data DUMY is the data prescribed so that the size of the audio file attribute data AFPD becomes 4096 bytes. The data A_SIZE indicates the data length of the audio data AUDIO. The audio data AUDIO is audio data of a format such as for example the AES (Audio Engineering Society) 3.

[MXF Process 8]

Figure 11:
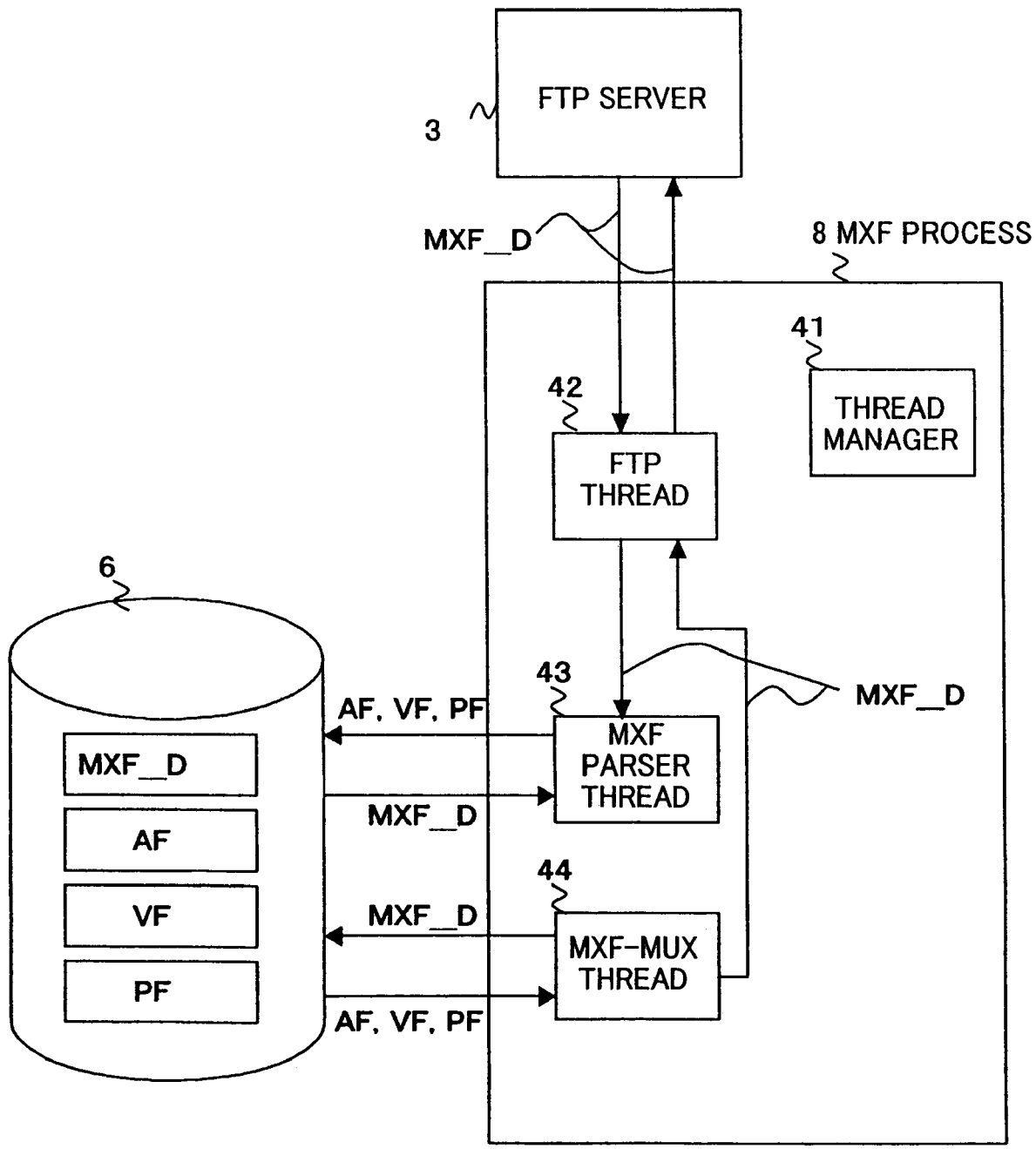
FIG. 11 is a view for explaining an MXF process shown in FIG. 2.

FIG. 11 is a view for explaining the MXF process 8 shown in FIG. 2. The MXF process 8 for example generates the video file data VF and the audio file data AF from the data MXF_D and generates the data MXF_D from the video file data VF and the audio file data AF. In this case, the MXF process 8 has, as shown in FIG. 11, for example a thread manager 41, an FTP thread 42, an MXF parser thread 43, and an MXF-MUX thread 44.

[Thread Manager 41]

The thread manager 41 activates the MXF parser thread 43 and the MXF-MUX thread 44 in response to commands from for example the edit processes 9a and 9b or a request such as the operation signal from the operation unit 12 shown in FIG. 3.

[FTP Thread 42]

The FTP thread 42 transfers data MXF_D by FTP with the FTP server 3. The FTP thread 42 outputs the data MXF_D received from the FTP server 3 to the MXF parser thread 43 by FTP. The FTP thread 42 transmits the data MXF_D input from the MXF-MUX thread 44 to the FTP server 3 by FTP.

[MXF Parser Thread 43]

The MXF parser thread 43 converts the data MXF_D received via the FTP thread 42 or the data MXF_D read out from the RAID 6 to the video file data VF and the audio file data AF and writes the same to the RAID 6. Further, the MXF parser thread 43 outputs the video data VIDEO and the audio data AUDIO extracted by parsing the data MXF_D input from the FTP thread 42 to the edit processes 9a and 9b in a format that the edit processes 9a and 9b can reproduce. In the present embodiment, the MXF parser thread 43 is not activated in a state where the MXF parse processing is not carried out. When the MXF parse processing is carried out, the thread manager 41 activates the MXF parser thread 43 in response to the commands from the edit processes 9a and 9b or a request such as the operation signal from the operation unit 12 shown in FIG. 3. Due to this, the processing load of the computer 4 (processing unit 15) can be reduced in a state where the MXF parse processing is not carried out.

Further, in the present embodiment, the FTP thread 42 and the MXF parser thread 43 are realized not by different programs, but by the same MXF process 8. Therefore, when the data MXF_D received by the MXF parser thread 43 via the FTP thread 42 is subjected to conversion processing, the MXF parse processing of the already received data MXF_D can be carried out in parallel with the reception processing of the data MXF_D by the FTP thread 42. Due to this, the processing time can be shortened compared with a case where the program for performing the FTP and the program for performing the MXF parse processing are separately prescribed and the MXF parse processing is carried out after the FTP processing with respect to the whole data MXF_D is ended.

Figure 12:
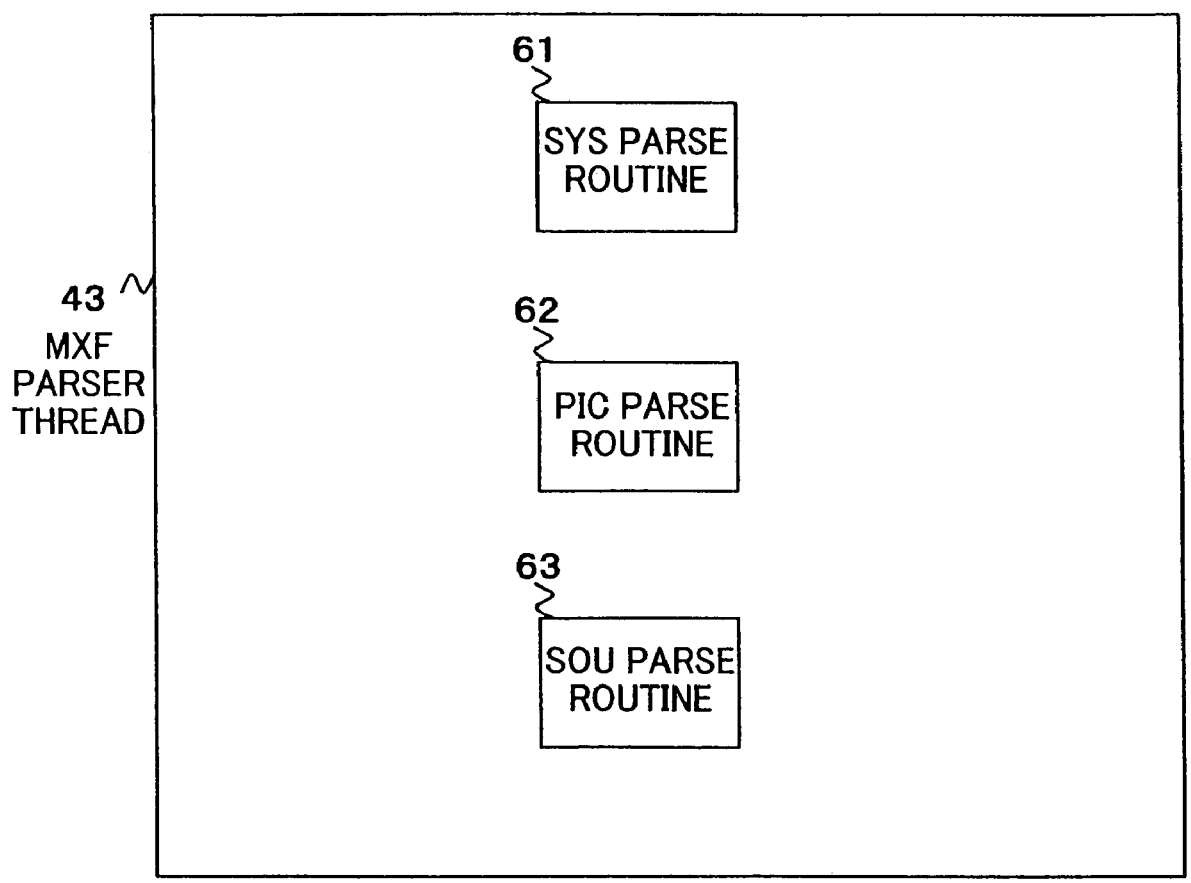
FIG. 12 is a view for explaining an MXF parser thread shown in FIG. 11.

FIG. 12 is a function block diagram of the MXF parser thread 43 shown in FIG. 11. As shown in FIG. 12, the MXF parser thread 43 has for example an SYS parse routine 61, a PIC parse routine 62, and an SOU parse routine 63. The MXF parser thread 43 generates a video file data VF comprised of video attribute file data VFPD generated by the SYS parse routine 61 and video data VIDEO generated by the PIC parse routine 62 as shown below. The MXF parser thread 43 generates the audio file data AF comprised of the audio attribute file data AFPD generated by the SYS parse routine 61 and the audio data AUDIO generated by the SOU parse routine 63. Further, the MXF parser thread 43 generates the attribute file data PF indicating the attributes concerning for example the video file data VF and the audio file data AF by the SYS parse routine 61 as will be shown below. In this case, the sequence of execution of the SYS parse routine 61, the PIC parse routine 62, and the SOU parse routine 63 is not particularly limited.

The SYS parse routine 61, the PIC parse routine 62, and the SOU parse routine 63 parse the data MXF_D shown in FIG. 5 to detect the key (K) of the KLV data shown in FIG. 6 and generate the data shown below based on the related detected key (K) by using data determined in advance.

The SYS parse routine 61 parses the data MXF_D shown in FIG. 5 and generates the video file attribute data VFPD of the video file data VF shown in FIG. 7 and the audio file attribute data AFPD of the audio file data AF shown in FIG. 9 based on the header data HEADER in the data MXF_D, the system data SYS in the frame data FLD_1 to FLD_n, and the footer data FOOTER.

Figure 13:
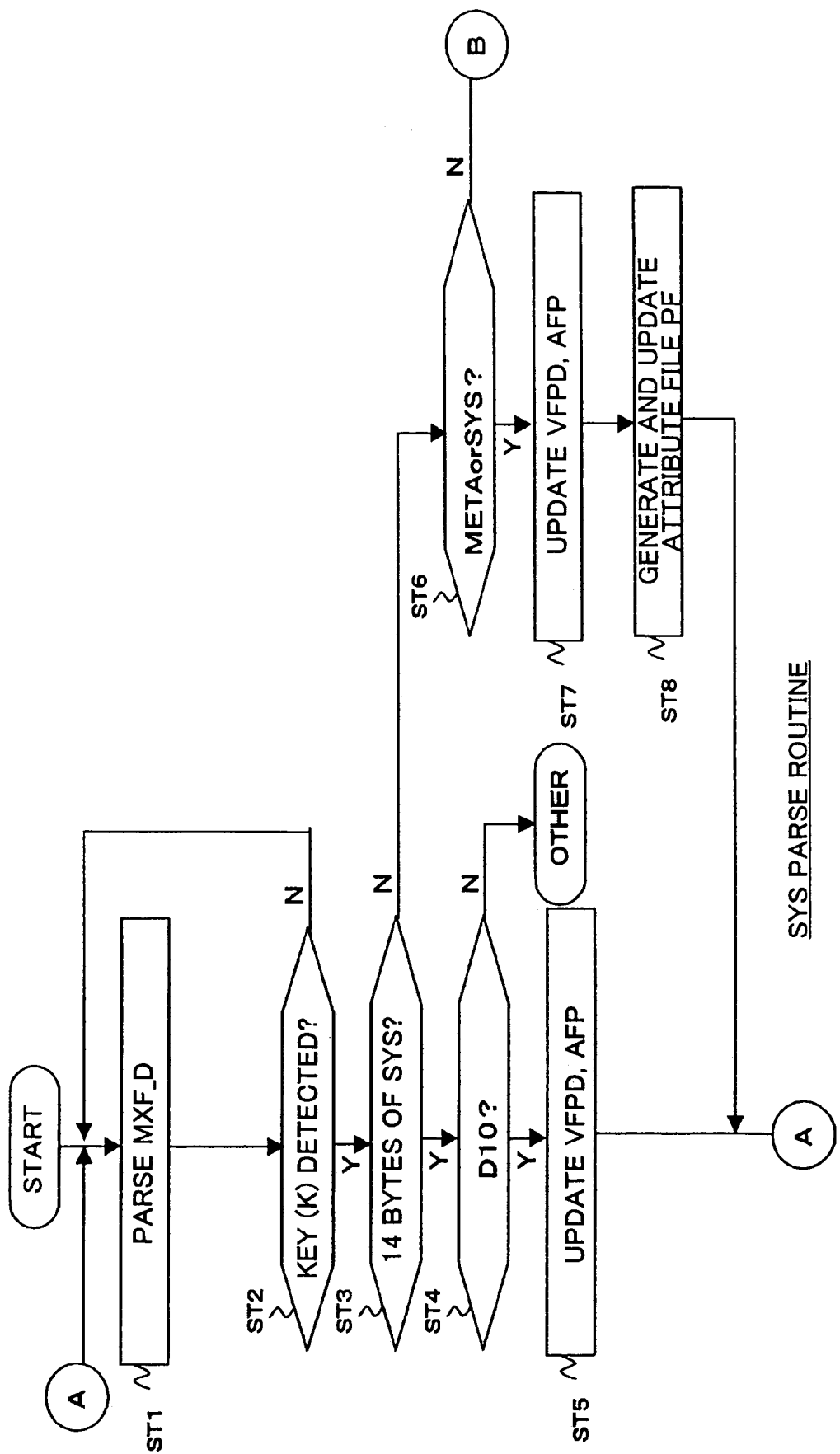
FIG. 13 is a flow chart for explaining processing of an SYS parse routine shown in FIG. 12.
Figure 14:
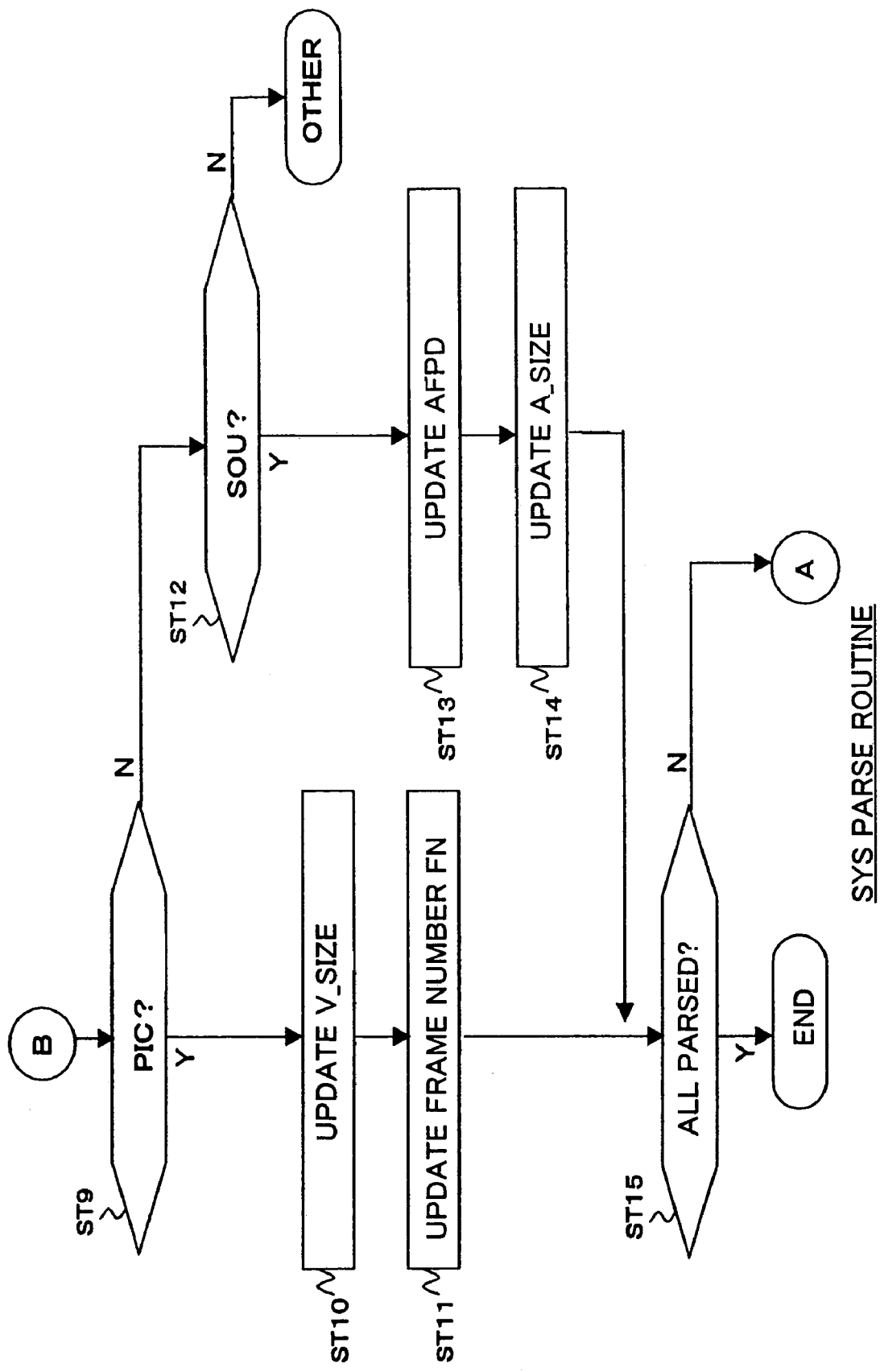
FIG. 14 is a flow chart continued from FIG. 13 for explaining the processing of the SYS parse routine shown in FIG. 12.

FIG. 13 and FIG. 14 are flow charts for explaining the processing of the SYS parse routine 61 shown in FIG. 12. Note that, in FIG. 13, it is also possible to perform the decision of step ST6 preceding the decision of step ST3.

Step ST1:

The SYS parse routine 61 parses the data MXF_D read out from the data MXF_D or the RAID6 input from the FTP thread 42.

Step ST2:

The SYS parse routine 61 decides whether or not the key (K) of the KLV data forming part of the data MXF_D was detected by the parse of step ST1. Where it was detected, the processing routine proceeds to step ST4, while where it was not detected, the processing routine returns to step ST6.

Step ST3:

The SYS parse routine 61 decides whether or not the key (K) detected at step ST1 concerns the 14-th byte (data at the predetermined position) of the system data SYS. When deciding that it concerns the 14-th byte, the processing routine proceeds to step ST4, while when it does not, the processing routine proceeds to step ST 6.

Step ST4:

The SYS parse routine 61 decides whether or not the data MXF_D has a "D10" format (predetermined format) based on the 14-th byte. Where it is the "D10" format, the processing routine proceeds to step ST5, while where it is not, the processing is terminated or the processing concerning another format is carried out.

Step ST5:

When the type of the data MXF_D is IMX50_625, IMX40_625, and IMX30_625, the SYS parse routine 61, based on the 15-th byte of the system data SYS, sets for example the values shown in FIG. 15(A) prescribed in advance as the VideoFormat, Width, Height, Framesize, Scale, Rate, and Scanlineinfo shown in FIG. 8 of the video common property data VCPD shown in FIG. 7 to update the video file attribute data VFPD. Here, the data Framesize is prescribed for example as shown in FIG. 16 in accordance with the type of the format. Further, the SYS parse routine 61 sets for example the values shown in FIG. 17 prescribed in advanced as the data wFormatTag, cChannels, nSamplesPerSec, nAvgBytesPerSec, nBlockAlign, wBitsPerSample, and cbSise shown in FIG. 10 of the WAVE property data WFPD shown in FIG. 9 to update the audio file attribute data AFPD. On the other hand, when the data MXF_D is IMX5_525, IMX40_525, and IMX30_525, the SYS parse routine 61, based on the 15-th byte of the system data SYS, sets for example the values shown in FIG. 15(B) prescribed in advance as the data VideoFormat, Width, Height, Framesize, Scale, Rate, and Scanlineinfo shown in FIG. 8 of the video common property data VCPD shown in FIG. 7 to update the video file attribute data VFPD.

Step ST6:

The SYS parse routine 61 decides whether or not the key (K) detected at step ST1 concerns the meta data META or the system data SYS. Where it does, the processing routine proceeds to step ST7, while where it does not, the processing routine proceeds to step ST9.

Step ST7:

The SYS parse routine 61 generates or updates the video file attribute data VFPD shown in FIG. 7 and the audio file attribute data AFPD shown in FIG. 9 based on the data (V) corresponding to the key (K) detected at step ST1.

Step ST8:

The SYS parse routine 61 generates or updates the attribute file data PF by using XML etc. based on the data (V) corresponding to the key (K) detected at step ST1. Namely, the SYS parse routine 61 generates the attribute file data PF indicating the attributes of the video file data VF and the audio file data AF based on the meta data META in the data MXF_D or the attribute data described in the system data SYS.

Step ST9:

The SYS parse routine 61 decides whether or not the key (K) detected at step ST1 concerns the video data PIC. Where it does, the processing routine proceeds to step ST10, while where it does not, the processing routine proceeds to step ST12.

Step ST10:

The SYS parse routine 61 adds the data length (L) corresponding to the key (K) detected at step ST1 to the data V_SIZE to update the data V_SIZE.

Step ST11:

The SYS parse routine 61 updates (increments) the frame number data FN.

Step ST12:

The SYS parse routine 61 decides whether or not the key (K) detected at step ST1 concerns the audio data SOU. Where it does, the processing routine proceeds to step ST13, while where it does not, the processing is terminated or other processing is carried out.

Step ST13:

The SYS parse routine 61 sets for example the values shown in FIG. 17 determined in advance as the WAVE property data WFPD shown in FIG. 10 of the audio file attribute data AFPD shown in FIG. 9. The related set-up may be carried out only when executing step ST13 first. The SYS parse routine 61 sets the channel status data CSD of the audio file attribute data AFPD shown in FIG. 9 based on the data (V) corresponding to the key (K) detected at step ST1, that is, the data Channel_Status of the audio data SOU of AES3. In the data Channel_Status, the information etc. for designating for example a valid channel is shown. Further, the SYS parse routine 61 changes the data nSamplesPerSec, nAvgBytesPerSec, nBlockAlign, and wBitsPerSample shown in FIG. 10 of the WAVE property data WFPD shown in FIG. 9 based on the data SamplingRate, AuxSampleBits, and WordLength prescribed by AES3 of the audio data SOU.

Step ST14:

The SYS parse routine 61 adds the data length (L) corresponding to the key (K) detected at step ST1 to the data A_SIZE to update the A_SIZE.

Step. ST15:

The SYS parse routine 61 decides whether or not the whole data MXF_D was parsed. When deciding that it was parsed, the processing routine is terminated, while where deciding it was not, the processing routine returns to step ST1. By the processings of FIG. 13 and FIG. 14, the header data HEADER and the system data SYS shown in FIG. 5 are generated.

The PIC parse routine 62 parses the data MXF_D shown in FIG. 5 and generates the video data VIDEO of the video file data VF shown in FIG. 7 based on the video data PIC in the frame data FLD_1 to FLD_n of the data MXF_D. The PIC parse routine 62 decodes for example the video data PIC by MPEG to generate the video data VIDEO where the video data PIC is encoded by MPEG.

Figure 18:
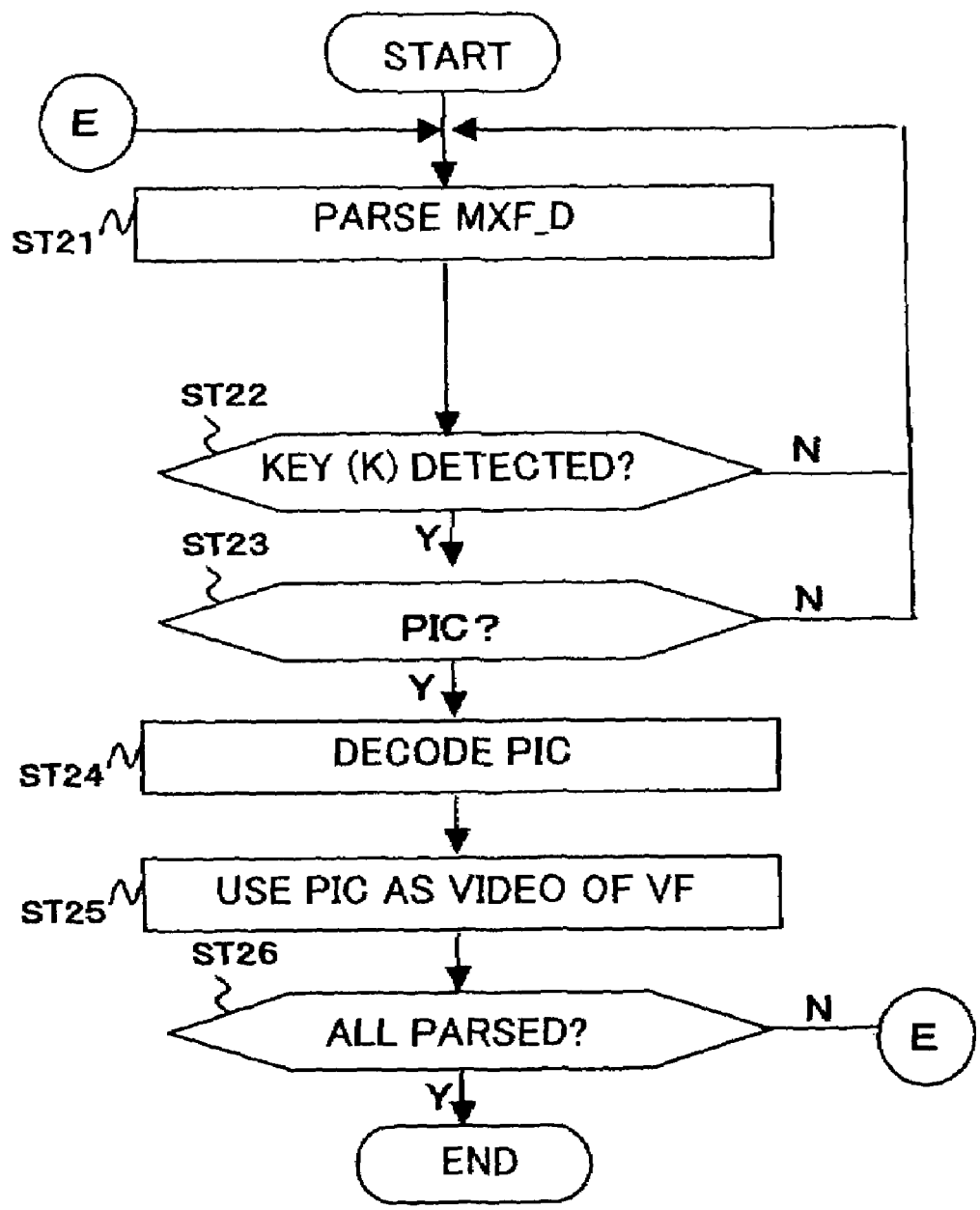
FIG. 18 is a flow chart for explaining the processing of a PIC parse routine shown in FIG. 12.

FIG. 18 is a flow chart for explaining the processing of the PIC parse routine 62 shown in FIG. 12.

Step ST21:

The PIC parse routine 62 parses the data MXF_D.

Step ST22:

The PIC parse routine 62 decides whether or not the key (K) of the KLV data composing the data MXF_D was detected by the parse of step ST21. Where it was detected, the processing routine proceeds to step ST22, while where it was not, the processing routine returns to step ST21.

Step ST23:

The PIC parse routine 62 decides whether or not the key (K) detected at step ST21 concerns the video data PIC. When deciding so, the processing routine proceeds to step ST24, while where not, the processing routine returns to step ST21.

Step ST24:

The PIC parse routine 62 decodes the video data PIC by the key (K) detected at step ST21 by the decoding method corresponding to the coding method described in for example the system data SYS or meta data META corresponding to that.

Step ST25:

The PIC parse routine 62 uses the video data PIC obtained by the decoding of step ST24 as the video data VIDEO of the video file data VF shown in FIG. 7.

Step ST26:

The PIC parse routine 62 decides whether or not all of the data MXF_D was parsed. When deciding all data MXF_D was parsed, the processing routine is terminated, while where not, the processing routine returns to step ST21.

The SOU parse routine 63 parses the data MXF_D shown in FIG. 5 to generate the audio data AUDIO of the audio file data AF shown in FIG. 9 based on the audio data SOU in the frame data FLD_1 to FLD_n of the data MXF_D. In this case, the SOU parse routine 63 separates a plurality of channel data to generate the audio data AUDIO where the audio data SOU is the AES3 standard.

Figure 19:
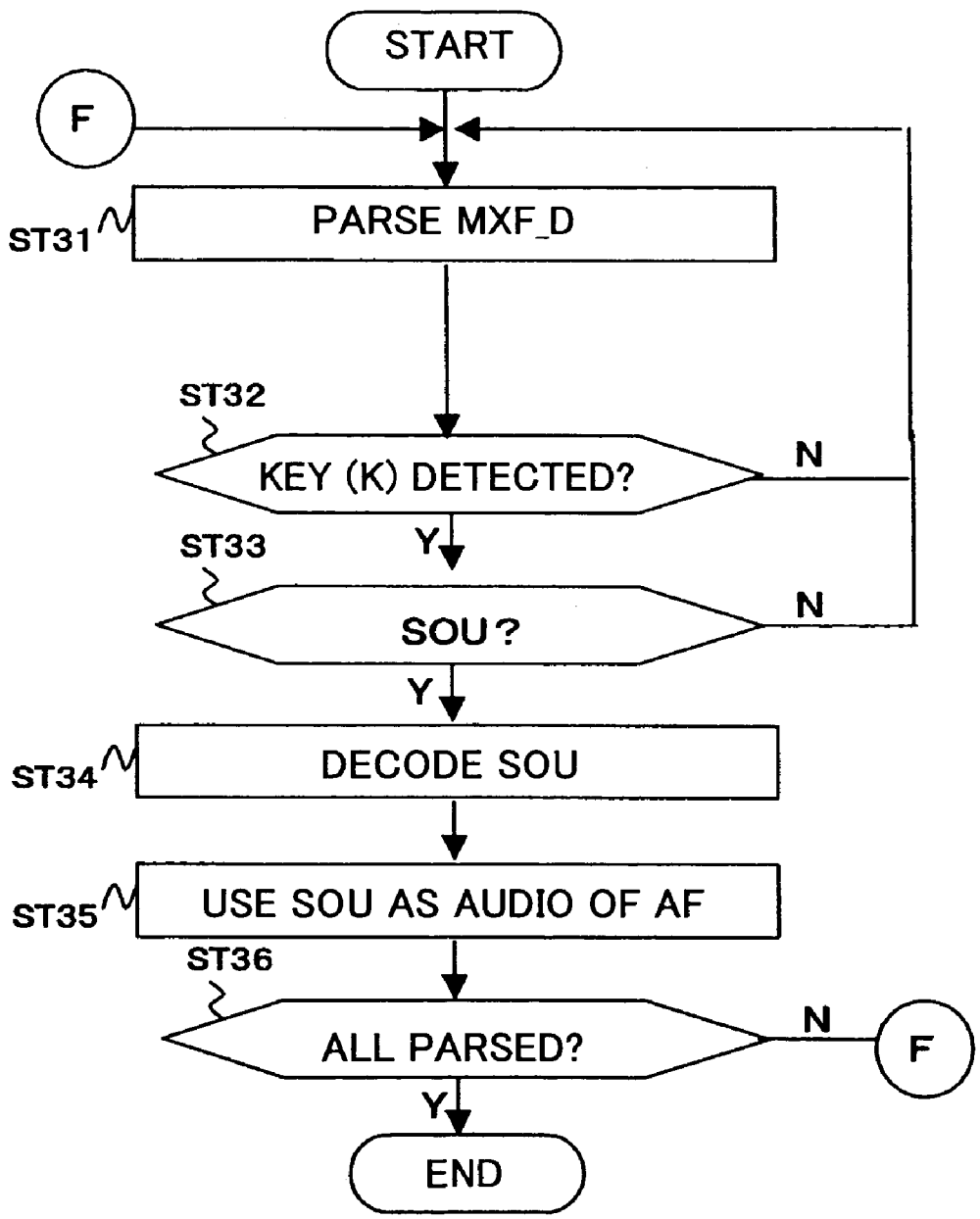
FIG. 19 is a flow chart for explaining the processing of an SOU parse routine shown in FIG. 12.

FIG. 19 is a flow chart for explaining the processing of the SOU parse routine 63 shown in FIG. 12.

Step ST31:

The SOU parse routine 63 parses the data MXF_D.

Step ST32:

The SOU parse routine 63 decides whether or not the key (K) of the KLV data composing the data MXF_D was detected by the parse of step ST31. Where it was detected, the processing routine proceeds to step ST32, while where it was not detected, the processing routine returns to step ST31.

Step ST33:

The SOU parse routine 63 decides whether or not the key (K) detected at step ST32 concerns the audio data SOU. When deciding it does, the processing routine proceeds to step ST34, while where deciding it does not, the processing routine returns to step ST31.

Step ST34:

The SOU parse routine 63 decodes the audio data SOU by the key (K) detected at step ST31 by the decoding method corresponding to the coding method described in for example the system data SYS corresponding to that.

Step ST35:

The SOU parse routine 63 uses the audio data SOU obtained by the decoding of step ST34 as the audio data AUDIO of the audio file data AF shown in FIG. 9.

Step ST36:

The SOU parse routine 63 decides whether or not the data MXF_D was all parsed. When deciding that the data MXF_D was all parsed, the processing routine is terminated, while when not, the processing routine returns to step ST31.

[MXF-MUX Thread 44]

The MXF-MUX thread 44 generates the data MXF_D based on the attribute file data PF, the video file data VF, and the audio file data AF. In the present embodiment, the MXF-MUX thread 44 is not activated in the state where the MXF-MUX processing is not carried out. Where the MXF-MUX processing is carried out, the thread manager 41 activates the MXF-MUX thread 44 in response to commands from the edit processes 9a and 9b or the request of the operation signal etc. from the operation unit 12 shown in FIG. 3. Due to this, the processing load of the computer 4 (processing unit 15) can be reduced in the state where the MXF-MUX processing is not carried out.

Figure 20:
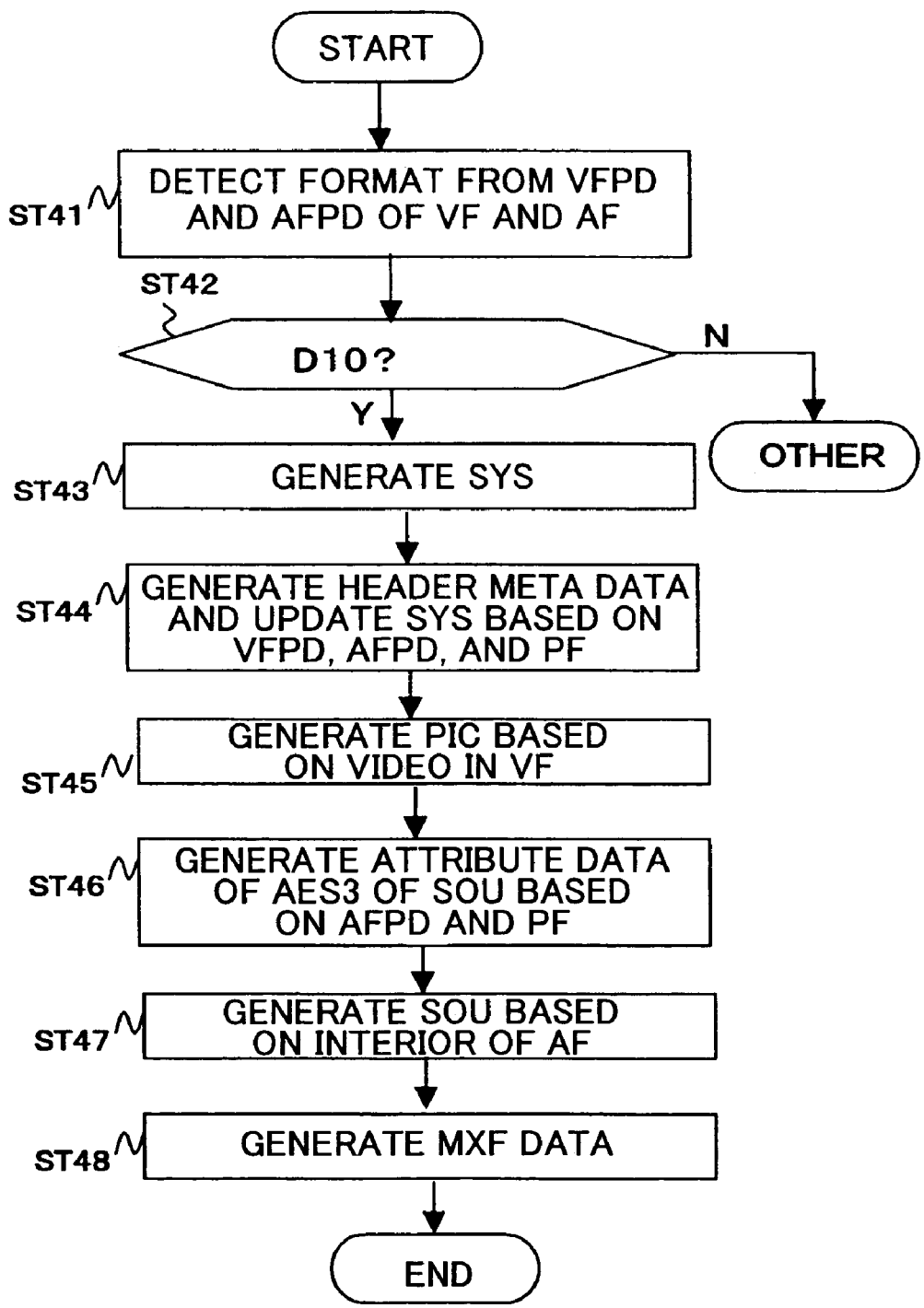
FIG. 20 is a flow chart for explaining the processing of an MXF-MXU thread shown in FIG. 11.

FIG. 20 is a flow chart for explaining the processing for generation of the data MXF_D by the MXF-MUX thread 44.

Step ST41:

The MXF-MUX thread 44 reads out the video file data VF shown in FIG. 7 designated as the conversion object from the RAID 6 upon request and detects the format used as the data MXF_D based on the data shown in FIG. 8 in the video common property data VCPD in the related video file data VF.

Step ST42:

The MXF-MUX thread 44 decides whether or not the format detected at step ST41 is "D10" (predetermined format). When deciding that the format is "D10", the processing routine proceeds to step ST43, while when not, it performs the processing corresponding to a format other than "D10".

Step ST43:

The MXF-MUX thread 44 sets the data indicating "D10" as the 14-th byte (data of the predetermined position) of the system data SYS of the frame data FLD_1 to FLD_n of the data MXF_D shown in FIG. 5. Further, the MXF-MUX thread 44 specifies the type of the format based on the data shown in FIGS. 15(A) and 15(B) in the video file data VF and the frameSise etc. shown in FIG. 16 and sets the related specified type as the 15-th byte of the system data SYS.

Step ST44:

The MXF-MUX thread 44 generates the header data HEADER shown in FIG. 5 and, at the same time, updates the system data SYS based on the video file attribute data VFPD of the video file data VF, the audio file attribute data AFPD of the audio file data AF, and the attribute file data PF.

Step ST45:

The MXF-MUX thread 44 encodes the video data VIDEO in the video file data VF by for example the coding method indicated by the video file attribute data VFPD (for example MPEG) to generate the video data PIC.

Step ST46:

The MXF-MUX thread 44 sets the "channel Status", "SamplingRate", "AuxSmpleBits", and "WordLength" of the audio data SOU of the AES3 in the frame data FL_1 to FL_n shown in FIG. 5 based on the audio file attribute data AFPD and the attribute file data PF of the audio file data AF.

Step ST47:

The MXF-MUX thread 44 generates the audio data SOU based on the data set at step ST46 and the audio data AUDIO in the audio file data AF.

Step ST48:

The MXF-MUX thread 44 generates the frame data FLD_1 to FLD_n based on the system data SYS, the video data PIC, the audio data SOU generated at the steps ST43 to ST47, and newly generated data AUX. Further, the MXF-MUX thread 44 generates the data MXF_D comprised of the header data HEADER generated at step ST44, the generated frame data FLD_1 to FLD_n, and newly generated footer data FOOTER, and writes it to the RAID 6. In the present embodiment, the MXF-MUX thread 44 directly receives the video file data VF and the audio file data AF and performs the processing as shown in FIG. 20 to generate the data MXF_D, whereby it is not necessary to once drop the video file data VF and the audio file data AF as temporary files, so the conversion time can be shortened.

[Edit Processes 9a and 9b]

Figure 21:
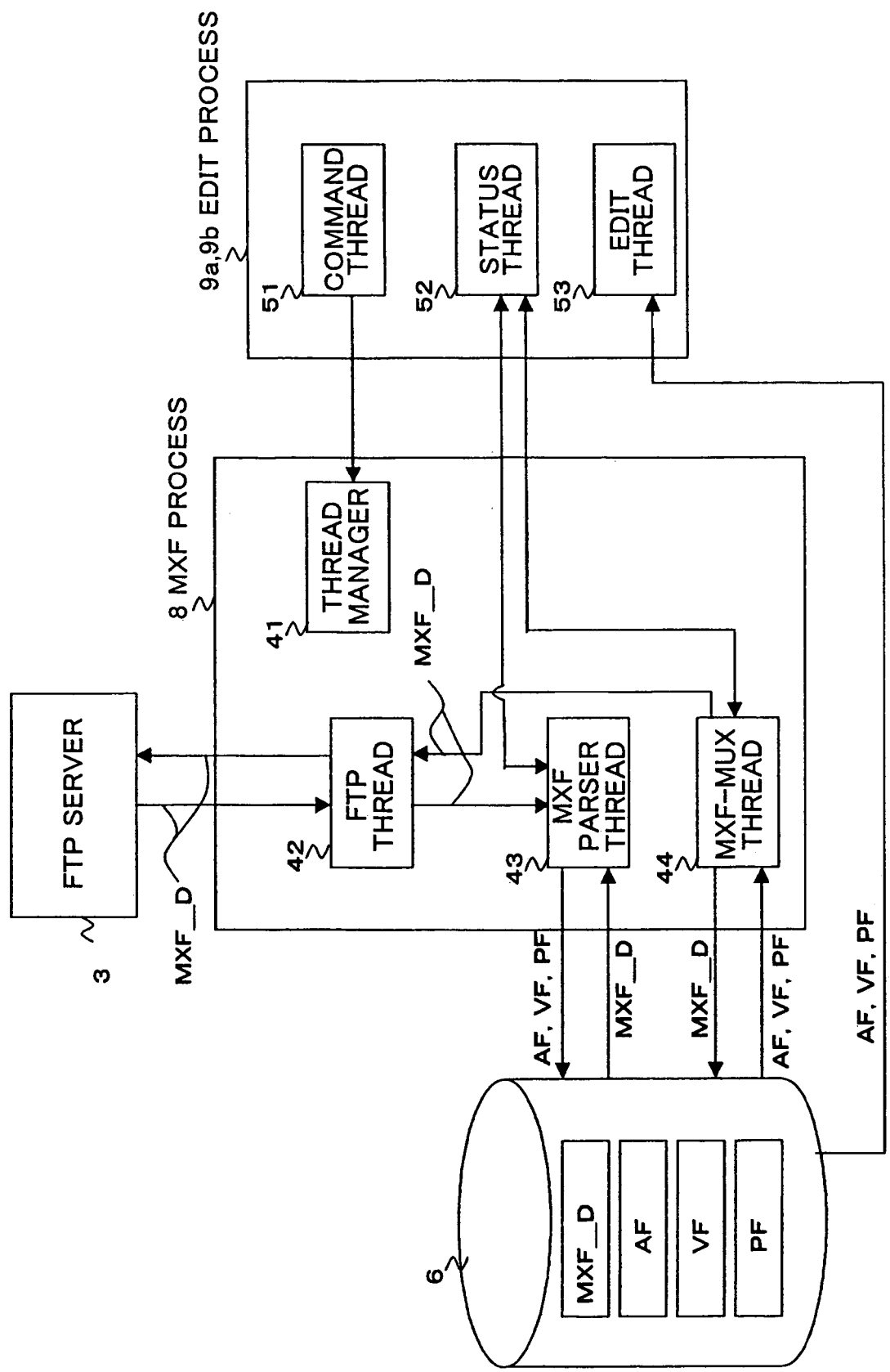
FIG. 21 is a view for explaining an edit process shown in FIG. 2.

FIG. 21 is a view for explaining the configurations of the edit processes 9a and 9b. As shown in FIG. 21, the edit processes 9a and 9b have for example a command thread 51, a status thread 52, and an edit thread 53. The command thread 51 outputs commands, for example a parse command and the MXF command, in accordance with for example the operation signals from the operation units 12 and 13 shown in FIG. 3 and FIG. 4 to the thread manager 41 of the MXF process 8. The status thread 52 outputs designation information of the data MXF_D, the video file data VF, the audio file data AF, etc. as the object of the parse and MUX (for example address of URL etc.), and outputs the data such as the identification data and password of the user of the edit processes 9a and 9b to the MXF parser thread 43 and the MXF-MUX thread 44. The edit thread 53 performs the edit processing by using for example the video file data VF and the audio file data AF written by the MXF parser thread 43 to the RAID 6 and, according to need, the attribute file data PF.

Figure 22:
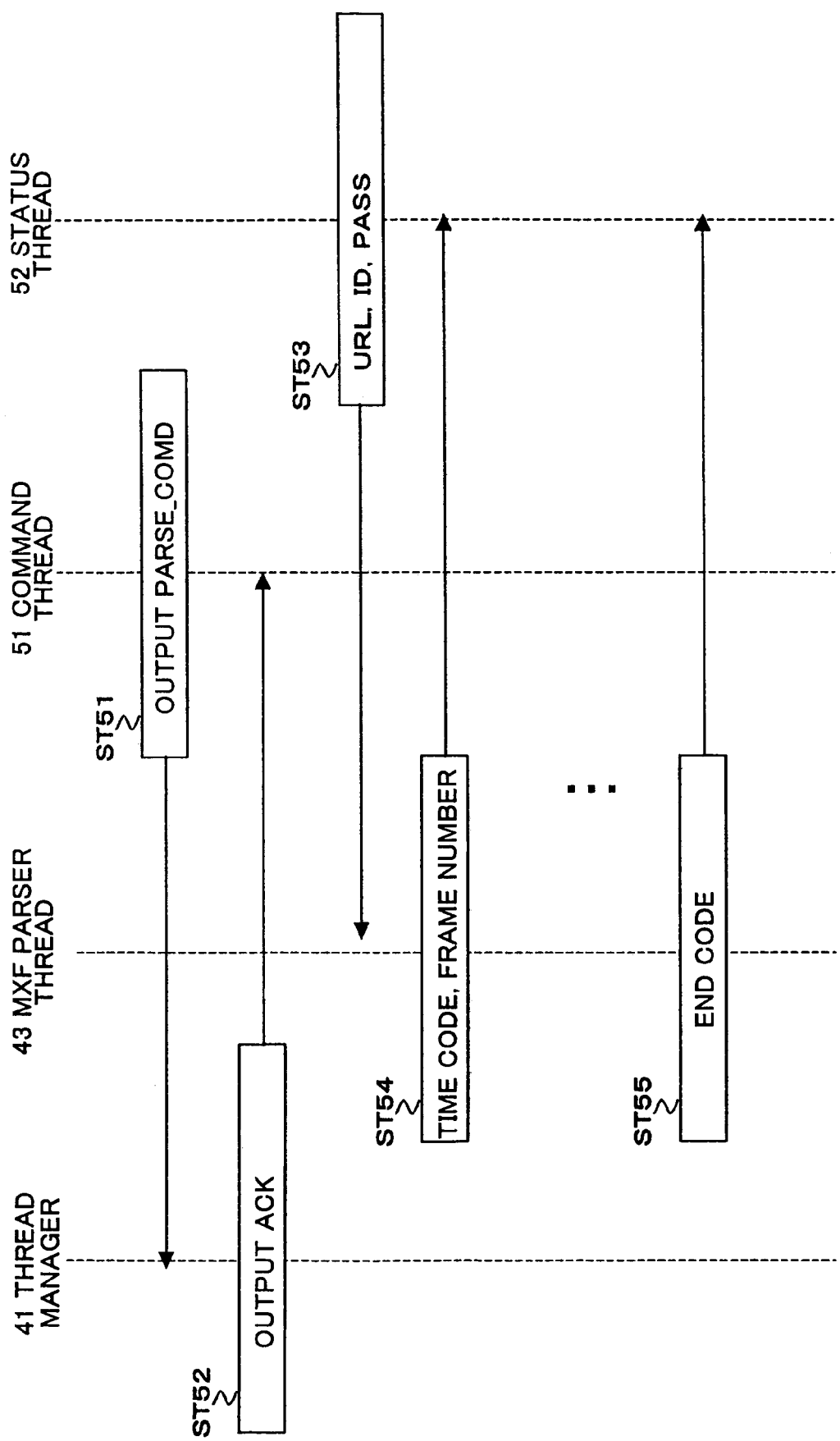
FIG. 22 is a view for explaining a request etc. transferred between the MXF process and the edit process where the MXF parser thread of the MXF process performs the parse processing in response to a request from the edit process shown in FIG. 2.

FIG. 22 is a view for explaining the request etc. transferred between the MXF process 8 and the edit processes 9a and 9b where the MXF parser thread 43 of the MXF process 8 performs the parse processing in response to requests from the edit processes 9a and 9b.

Step ST51:

The command thread 51 outputs for example the parse command PARSE_COMD in accordance with the operation signals from the operation units 12 and 13 shown in FIG. 3 and FIG. 4 to the thread manager 41 of the MXF process 8. The thread manager 41 activates the MXF parser thread 43 in response to the parse command PARSE_COMD.

Step ST52:

The thread manager 41 outputs an acknowledgement ACK including an interface name (for example pipe name) used for the data transfer with the command thread 51 to the command thread 51.

Thereafter, the transfer of the data and request between the thread manager 41 and the command thread 51 is carried out by designating the related pipe name.

Step ST53:

The status thread 52 outputs designation information (for example the address of URL etc.) of the data MXF_D as the object of the parse and MXF, the identification data ID, password PASS, etc. of the user of the edit processes 9a and 9b to the MXF parser thread 43.

Step ST54:

The MXF parser thread 43 performs the parse processing mentioned before based on FIG. 13, FIG. 14, FIG. 18, and FIG. 19 with respect to the data MXF_D designated by the designation information received at step ST52 and writes the video file data VF, the audio file data AF, and the attribute file data PF generated by that to the RAID 6. The parse processing by the MXF parser thread 43 at step ST54 may perform all processings of FIG. 13, FIG. 14, FIG. 18, and FIG. 19 too or may perform only the processing concerning the generation of the video data VIDEO and the audio data AUDIO. Then, the MXF parser thread 43 outputs the time code of the frame data FLD_1 to FLD_n terminating the parse processing and the frame number to the status thread 52 in accordance with the advance of the parse processing. The MXF parser thread 43 outputs the time code and the frame number to the status thread 52 whenever the parse processing of each frame data is completed until the parse processing for all frame data FLD_1 to FLD_n in the data MXF_D is completed.

Step ST55:

The MXF parser thread 43 outputs the end code to the status thread 52 when completing the parse processing for all frame data FLD_1 to FLD_n in the data MXF_D. For example, the edit process 9a on the computer 4 shown in FIG. 2(A) outputs the parse command PARSE_COMD designating the name of the data MXF_D and the names of the video file data VF and the audio file data AF with respect to the MXF process 8 on the computer 4 as shown in FIG. 22. By this, the MXF process 8 performs the parse processing of the data MXF_D while receiving as input the data MXF_D from the FTP thread 42 and writes the result to for example the RAID 6. In this case, the MXF process 8 and the edit process 9a are operating on the same computer 4, so the processing load of the MXF process 8 exerts an influence upon the processing of the edit process 9. Due to this, the edit process 9a issues a request for suspending the parse processing of the MXF process 8 to the MXF process 8 in accordance with the operation of the user. By this, the MXF process 8 interrupts the parse processing, and the computer 4 can concentrate on the processing of the edit process 9.

Figure 2B:
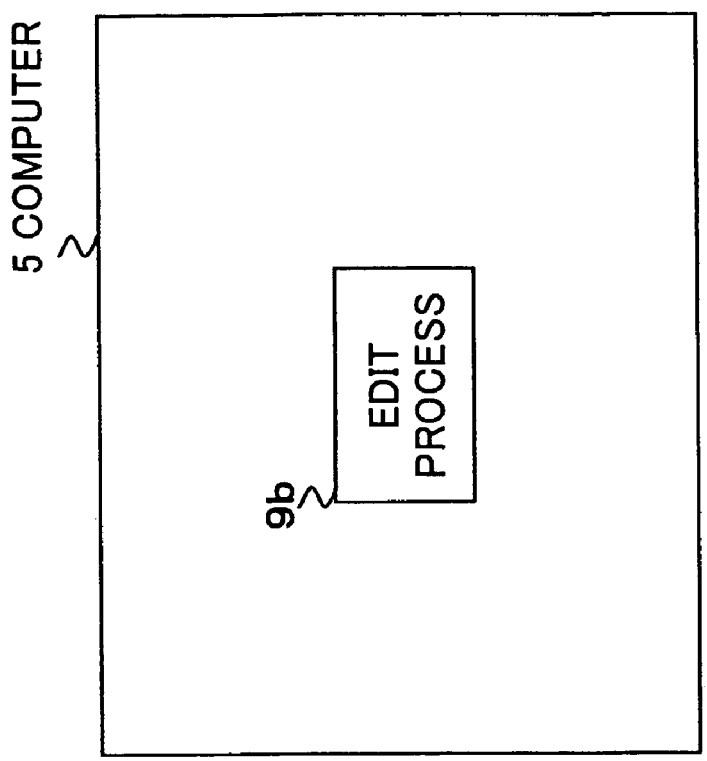
FIG. 2 is a view for explaining a process operating on computers 4 and 5 shown in FIG. 1.
Figure 2A:
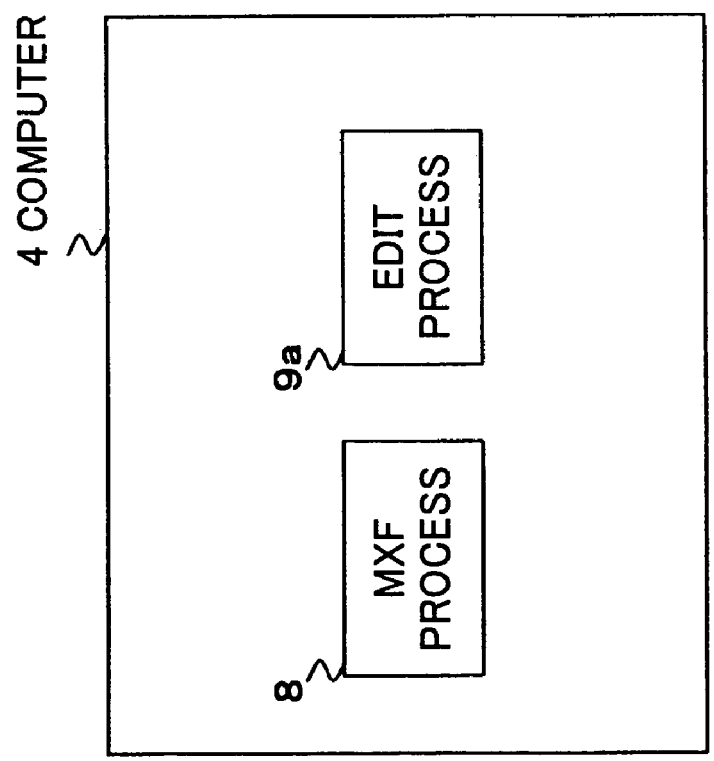

On the other hand, the edit process 9b on the computer 5 shown in FIG. 2(B), as shown in FIG. 22, outputs the parse command PARSE_COMD designating the name of the data MXF_D and the names of the video file data VF and the audio file data AF to the MXF process 8 on the computer 4. By this, the MXF process 8 performs the parse processing of the data MXF_D while receiving as input the data MXF_D from the FTP thread 42 and writes the result to for example the RAID 6. In this case, since the MXF process 8 and the edit process 9a are operating on different computers 4 and 5, the processing load of the MXF process 8 will not exert an influence upon the processing of the edit process 9.

[Reproduction Process 80]

Figure 23:
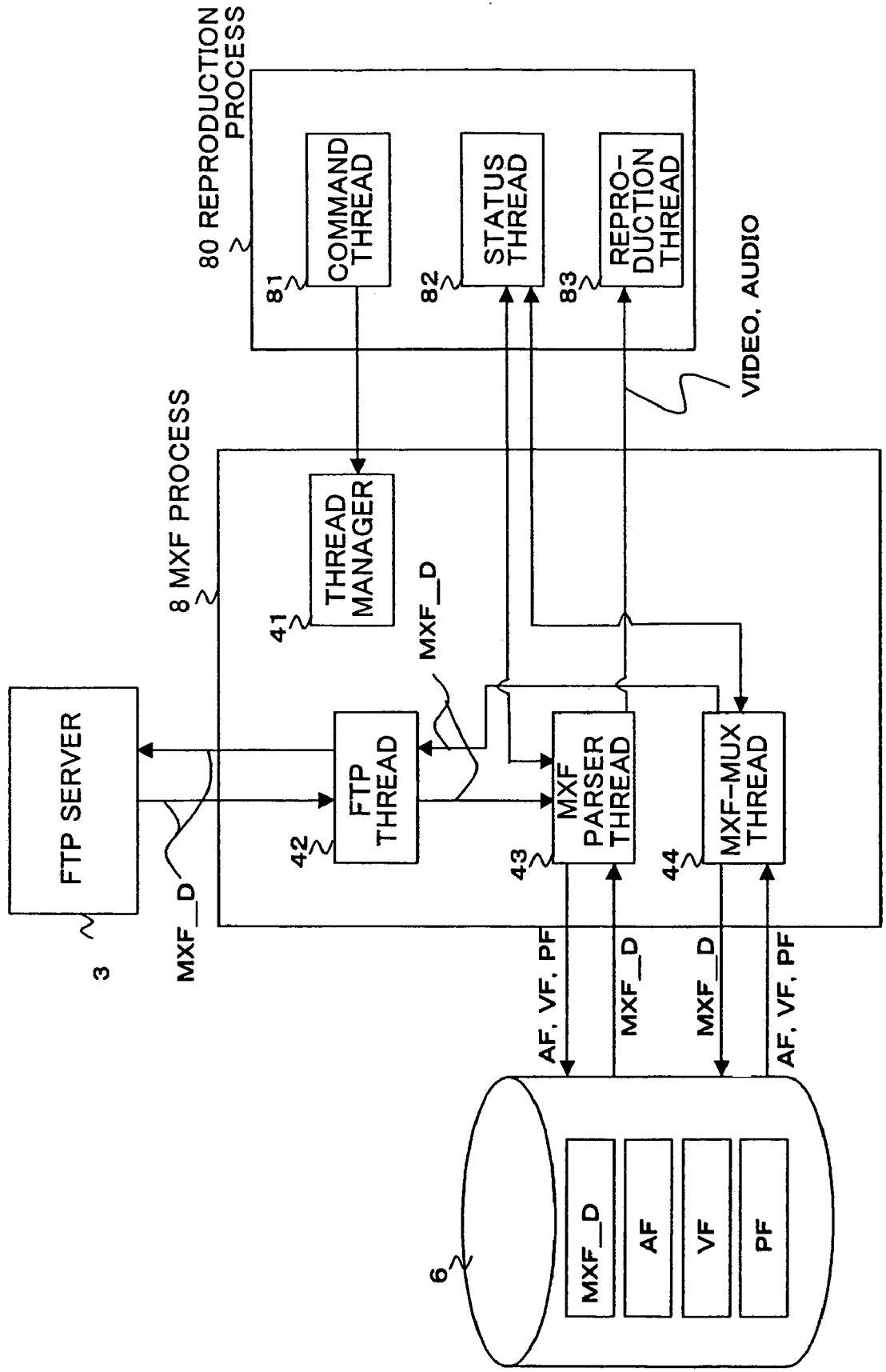
FIG. 23 is a view for explaining a reproduction process.

The computer 4 or the computer 5 executes for example the predetermined reproduction program to activate the reproduction process 80 shown in FIG. 23. The reproduction process 80 has, for example, as shown in FIG. 23, a command thread 81, a status thread 82, and a reproduction thread 83. The reproduction thread 83 performs the processing for reproduction of the video data VIDEO and the audio data AUDIO input from the MXF parser thread 43 of the MXF process 8. FIG. 24 is a view of the configuration of the reproduction thread 83 shown in FIG. 23. As shown in FIG. 24, the reproduction thread 83 has for example an UI seek screen routine 71, a video render routine 72, an UI audio channel selection routine 73, and an audio render routine 74. The UI seek screen routine 71 displays an UI (User Interface) screen for outputting a seek request SEEK_REQ of the frame data to the SYS parse routine 61 on the display units 13 and 23 as shown in FIG. 25 in response to for example the operation signals from the operation units 12 and 22. The related seek request SEEK_REQ is a request designating for example the frame data parsed by the MXF parser thread 43 of the MXF process 8 by for example the frame number.

The video render routine 72 performs the processing for reproduction of the video data VIDEO input from the PIC parse routine 62. By this, an image in accordance with the video data VIDEO is displayed on the display units 13 and 23. In this case, the video render routine 72 performs the synchronization processing with the audio render routine 74 so that for example the reproduced image and sound are synchronized. The video render routine 72 decides whether or not for example the previous reproduction processing time of the video data VIDEO corresponding to one frame data was longer than the time determined in advance as the time for reproducing one set of frame data. When deciding it is longer, as shown in FIG. 25, it outputs the drop request DROP_REQ to the PIC parse routine 62. Namely, the video render routine 72 outputs the drop request DROP_REQ to the PIC parse routine 62 when the processing of reproduction of normal speed or more of the video data VIDEO cannot be carried out due to the processing capability of the processing unit 15 shown in FIG. 3 or the processing unit 25 shown in FIG. 4. Due to this, a deviation of timing between the sound output and the image output and a deterioration of the image quality due to the delay of the processing for reproduction of the video data VIDEO by the processing units 15 and 25 can be prevented.

The UI audio channel selection routine 73 performs processing for selecting channels not to be reproduced in the reproduction thread 54 when the audio data of a plurality of channels prescribed by the AES3 are included in the audio data SOU of for example the frame data FLD_1 to FLD_n of the data MXF_D. The UI audio channel selection routine 73 outputs an unrequired channel designation request CH_REQ specifying the channels not to be reproduced designated by the user to the SOU parse routine 63.

The audio render routine 74 performs the processing for reproduction of the audio data AUDIO input from the SOU parse routine 63. By this, sound is output in accordance with the audio data AUDIO.

Below, an explanation will be given of the processing of the MXF parser thread 43 of the MXF process 8 of outputting the video data VIDEO and the audio data AUDIO to the reproduction thread 83 in response to commands from the edit processes 9a and 9b or requests of the operation signals etc. from the operation unit 12 shown in FIG. 3. The MXF parser thread 43 is activated by the thread manager 41 in response to commands from the edit processes 9a and 9c or requests of the operation signals etc. from the operation unit 12 shown in FIG. 3 and performs the following processing. The processing of the MXF parser thread 43 shown below is carried out with respect to the data MXF_D input from the FTP thread 42 and is carried out in parallel with the reception processing by the FTP thread 42. Further, the processing of the MXF parser thread 43 shown below may be carried out with respect to the data MXF_D read out from the RAID 6 too.

Note that the MXF parser thread 43 does not perform the processing of steps ST71 and ST72 when the processing of FIG. 26 is carried out with respect to the data MXF_D input from the FTP thread 42.

FIG. 26 is a flow chart for explaining the processing of the MXF parser thread 43 of the MXF process 8 of outputting the video data VIDEO and the audio data AUDIO to the reproduction thread 83. The MXF parser thread 43 sequentially performs the parse processings by the SYS parse routine 61, the PIC parse routine 62, the SOU parse routine 63, and the AUX parse routine for each of frame data FLD_1 to FLD_n shown in FIG. 5 when performing processing with the reproduction thread 83.

Step ST71:
The SYS parse routine 61 of the MXF parser thread 43 shown in FIG. 12 decides whether or not the seek request SEEK_REQ was input from the UI seek screen routine 71 of the reproduction thread 83 shown in FIG. 24. When deciding it was, the processing routine proceeds to step ST72, while where it not, the processing routine proceeds to step ST73.

Step ST72:
The SYS parse routine 61 moves for example a seek pointer SP indicating the reading position (address) of the data MXF_D recorded in the RAID 6 to the address corresponding to the frame number indicated by the seek request SEEK_REQ received at step ST71. The related seek pointer SP is updated to the address of the frame data to be read out next whenever the frame data of the data MXF_D is read out. In this way, by moving the seek pointer SP preceding the processings of the SYS parse routine 61, the PIC parse routine 62, and the SOU parse routine 63, the seek operation becomes possible without exerting an influence upon the processing of the PIC parse routine 62 and the SOU parse routine 63, and the configuration of the MXF parser thread 43 can be simplified.

Step ST73:
The SYS parse routine 61 reads out the system data SYS of the frame data FLD recorded at the address on the RAID 6 indicated by the seek pointer SP and performs the parse processing.

Step ST74:
The PIC parse routine 62 reads out the video data PIC continuing from the system data read out at step ST73 from the RAID 6 and performs the parse processing.

Step ST75:
The PIC parse routine 62 decides whether or not A drop request DROP_REQ was input from the video render routine 72. When deciding that the drop request was input, the processing routine proceeds to step ST76, while when not, the processing routine proceeds to step ST77.

Step ST76:
The PIC parse routine 62 decodes the video data PIC read out at step ST74 by the decoding method corresponding to the coding method indicated by the system code SYS read out at step ST73 to generate the video data VIDEO and outputs this to the video render routine 72. Namely, when receiving the drop request DROP_REQ, by steps ST75 and ST76, the PIC parse routine 62 suspends the output of 1 frame's worth of the video data VIDEO to the video render routine 72. Note that, it is also possible to suspend the output of 2 frames' worth or more of the video data VIDEO.

Step ST77:
The SOU parse routine 63 reads out the audio data SOU continuing from the video data PIC read out at step ST74 and performs the parse processing.

Step ST78:
The SOU parse routine 63 decides whether or not the unrequired channel designation request CH_REQ was input from the UI audio channel selection routine 73. When deciding that it was input, the processing routine proceeds to step ST79, when not, the processing routine proceeds to step ST80.

Step ST79:
The SOU parse routine 63 separates the audio data SOU read out at step ST77 to a plurality of channels of audio data AUDIO, selects and decodes the audio data AUDIO of the channels which are not designated by the unrequired channel designation request CH_REQ among them, and outputs the same to the audio render routine 74. In this case, the SOU parse routine 63 performs the decoding of the audio data AUDIO by the decoding method corresponding to the coding method indicated by the system code SYS read out at step ST73.

Step ST80:
The SOU parse routine 63 outputs all of the audio data AUDIO of the plurality of channels comprised of the audio data SOU read out at step ST77 to the audio render routine 74.

Note that, in the processing shown in FIG. 26 mentioned above, the decision of step ST75 is carried out preceding step ST74. When receiving the drop request DROP_REQ, the parse processing of the video data PIC by step ST74 may not be carried out either.

FIG. 27 is a view for explaining the request etc. transferred between the MXF process 8 and the reproduction process 80 where the MXF parser thread 43 of the MXF process 8 performs the parse processing in response to the request from the reproduction process 80.

Step ST91:
The command thread 81 outputs for example the play command PLAY_COMD in response to for example the operation signals from the operation units 12 and 13 shown in FIG. 3 and FIG. 4 to the thread manager 41 of the MXF process 8. The thread manager 41 activates the MXF parser thread 43 in accordance with the play command PLAY_COMD.

Step ST92:
The thread manager 41 outputs an acknowledgement ACK including the name of the pipe as the interface used for the communication to the command thread 51 in response to the play command PLAY_COMD.

Step ST93:
The status thread 82 outputs the designation information of the data MXF_D as the object of the reproduction (for example address of URL etc.), the identification data ID, password PASS, etc. of the user of the reproduction process 80 to the MXF parser thread 43.

Step ST94:
The status thread 82 outputs the reproduction request R_REQ including the frame numbers of the frame data FLD_1 to FLD_n to be reproduced next to the MXF parser thread 43 in accordance with the progress of the reproduction processing.

Step ST95:
The MXF parser thread 43 performs the parse processing explained by using FIG. 25 and FIG. 26 with respect to the frame data FLD_1 to FLD_n of the frame numbers designated by the related reproduction request R_REQ in response to the reproduction request R_REQ of step ST94. Further, the time code of the frame data FLD_1 to FLD_n subjected to the parse processing by at least one routine among the SYS parse routine 61 of the MXF parser thread 43, the PIC parse routine 62, and the SOU parse routine 63, and the frame number are output to the status thread 82. The MXF parser thread 43 repeats the above processing until the parse processing for all frame data FLD_1 to FLD_n in the data MXF_D is completed.

Step ST96:

The status thread 82 outputs a play end request PLAY_END to the MXF parser thread 43.

Step ST97:

The MXF parser thread 43 terminates the parse processing in response to the play end request PLAY_END. Then, the MXF parser thread 43 outputs the end code to the status thread 82. In this way, the MXF parser thread 43 has the function of receiving the play end request PLAY_END from the status thread 82 and thereby is able to give priority to the edit processing by the edit process 8a when the MXF process 8 and the edit process 9a are operating on the same computer like the computer 4 and able to efficiently perform the editing work.

Below, an explanation will be given of an example of the main operation of the editing system 1. In the editing system 1, as shown in FIG. 25, the MXF parser thread 43 parses the data MXF_D storing, mixed together, a plurality of video data PIC, a plurality of audio data SOU, and a plurality of system data indicating attributes of the video data PIC and the audio data SOU. The MXF parser thread 43 has an SYS parse routine 61, a PIC parse routine 62, and an SOU parse routine 63. The SYS parse routine 61 parses the data MXF_D to extract the system data SYS. The PIC parse routine 62 parses the data MXF_D to extract the video data PIC and decodes the related extracted video data PIC based on the system data SYS extracted by the SYS parse routine 61. Further, the SOU parse routine 63 parses the data MXF_D to extract the audio data SOU and decodes the related extracted audio data SOU based on the system data SYS extracted by the SYS parse routine 61.

Further, the video render routine 72 shown in FIG. 25 performs the processing for reproduction of the video data VIDEO from the MXF parser thread 43 in synchronization with the processing for reproduction of the audio by the audio render routine 74. The UI audio channel selection routine 73, when deciding that the video data VIDEO cannot be reproduced at normal speed or more, outputs a request for suspending the input of the video data VIDEO to the MXF parser thread 43.

As explained above, according to the computer 4, the video data and the audio data can be individually decoded based on the data MXF_D Further, according to the computer 4, the MXF parser thread 43 receives the seek request SEEK_REQ and performs the seek processing as shown in FIG. 25, whereby the frame data to be reproduced by the reproduction thread 83 can be quickly subjected to the MXF parse processing with a simple configuration. Further, according to the computer 4, the MXF parser thread 43 receives the drop request DROP_REQ and performs the drop processing, whereby it becomes possible for the reproduction thread 83 to stably perform the normal speed reproduction in a state where the video and audio are synchronized. Further, according to the computer 4, the MXF parser thread 43 performs the parse processing of the SOU parse routine 63 for the unrequired channels based on the unrequired channel designation request CH_REQ, so the processing load of the computer 4 can be reduced.

Further, according to the computer 4, the video file data VF shown in FIG. 7 and the audio file data AF shown in FIG. 9 can be automatically generated from the data MXF_D shown in FIG. 5. Further, according to the computer 4, the data MXF_D shown in FIG. 5 can be automatically generated from the video file data VF shown in FIG. 7 and the audio file data AF shown in FIG. 9. Further, according to the computer 4, by converting the data MXF_D to data which can be reproduced by the reproduction process 80 by the MXF parser thread 43, the reproduction processing by the reproduction process 80 based on the data MXF_D becomes possible. Further, according to the computer 4, as shown in FIG. 11, by prescribing the FTP thread 42 and the MXF parser thread 43 by the MXF process 8 and performing the receiving processing by the FTP thread 42 and the parse processing by the MXF parser thread 43 in parallel, the total time of the FTP reception time and the parse processing can be shortened. Further, according to the computer 4, the thread manager 41 activates the MXF parser thread 43 when performing the MXF parse processing, while activates the MXF-MUX thread 44 when performing the MUX processing, so the processing load of the processing unit 15 when not performing the MXF parse processing and the MUX processing can be reduced.

The present invention is not limited to the above embodiment. For example, in the above embodiment, the video file data VF and the audio file data AF were exemplified as the formats which could be processed by the edit processes 9a and 9b, but the format is not especially limited so far as it is a format which can be processed on a general computer, and other than this, as the video data, also a format such as the RGB format and a YUV format can be used. Further, in the above embodiment, the data MXF_D was exemplified as the processed data of the present invention, but the present invention can use data other than the data MXF_D as the processed data also so far as it is data storing, mixed together, a plurality of audio data, and a plurality of first attribute data indicating the attributes of the video data and the audio data.

The present invention can be applied to a system for converting the format of data concerning the video data and the audio data.

What we claim is:

1. A computer programmed to process input data to provide video and audio output data, said computer performing processing routines comprising:

a first processing routine for parsing said input data comprised of a plurality of video data, a plurality of audio data, and a plurality of attribute data indicating the attributes of said video data and said audio data so as to extract said attribute data, said input data being formed of a plurality of module data, each module data including a single unit of said video data, said audio data to be reproduced together with said video data, and said attribute data;

a second processing routine for parsing said input data to extract said video data and to decode the extracted video data based on said attribute data extracted by said first processing routine;

wherein said second processing routine outputs said decoded video data to a reproduction process unit and suspends the output of said decoded video data for a predetermined number of modules of said module data in accordance with a request from said reproduction process unit; and a third processing routine for parsing said input data to extract said audio data and to decode the extracted audio data based on said attribute data extracted by said first processing routine;

said computer performing said second processing routine and said third processing routine after said first processing routine for each of said plurality of module data.

2. A programmed computer to process input video data and audio data received in a converted format, from a processing unit, said computer performing a predetermined data conversion routine to generate said video data and said audio data in reproducible format and reproducing said video data and said audio data in synchronization, suitable for display, said computer performing a routine to decide that said video data cannot be reproduced in said reproducible format at a normal or higher speed, and said computer outputting a request to said processing unit for suspending the inputting of said video data, such that the reproduction of new input video and audio data is suspended while the inputting of converted video data is suspended.

3. The programmed computer as set forth in claim 2, wherein said processing unit outputs an unrequired channel designation request designating unrequired channels among a plurality of channels included in the audio data to be converted in accordance with said predetermined data conversion routine.

4. The programmed computer as set forth in claim 2, wherein said computer outputs to said processing unit a request designating frame data of said video data and audio data to be reproduced next.

5. A data processing method for performing processing by receiving as input video data and audio data from a conversion process that converts the video and audio data format by data converting the input video and audio to generate video data and audio data in reproducible format and reproducing the same suitable for display, comprising:

a first step of reproducing, in said reproducible format, said video data and said audio data input from said conversion process in synchronization;

a second step of deciding whether or not said video data can be reproduced in said reproducible format by said first step at normal speed or more; and a third step, when deciding in said second step that the data cannot be reproduced at normal speed or more, outputting a request to said conversion process for suspending the inputting of said video data, such that the reproduction of new input video and audio data is suspended while the inputting of converted video data is suspended.

6. A data processing system for receiving video data and audio data in a converted format from a conversion unit to generate therefrom video data and audio data in reproducible format and to reproduce the generated video data and audio data suitable for display, comprising:

a first unit for reproducing, in said reproducible format, said video data and said audio data input from said conversion unit in synchronization;

a second unit for deciding whether or not said video data can be reproduced in said reproducible format by said first unit at a normal or higher speed; and a third unit operable when said second unit decides that the video data cannot be reproduced at said normal or higher speed, for outputting to said conversion unit a request for suspending the inputting of said video data, such that the reproduction of new input video and audio data is suspended while the inputting of converted video data is suspended.

* * * * *